US010448409B2

(12) United States Patent
Sagong et al.

(10) Patent No.: US 10,448,409 B2
(45) Date of Patent: Oct. 15, 2019

(54) CHANNEL ALLOCATION DEVICE AND METHOD IN WIRELESS COMMUNICATION SYSTEM

(71) Applicant: Samsung Electronics Co., Ltd., Suwon-si, Gyeonggi-do (KR)

(72) Inventors: Min Sagong, Suwon-si (KR); Yeohun Yun, Hwaseong-si (KR); Taeyoung Kim, Seoul (KR); Jiyun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/742,778

(22) PCT Filed: Jul. 29, 2016

(86) PCT No.: PCT/KR2016/008341
§ 371 (c)(1),
(2) Date: Jan. 8, 2018

(87) PCT Pub. No.: WO2017/023030
PCT Pub. Date: Feb. 9, 2017

(65) Prior Publication Data
US 2018/0206239 A1    Jul. 19, 2018

(30) Foreign Application Priority Data
Aug. 3, 2015    (KR) .......................... 10-2015-0109546

(51) Int. Cl.
*H04W 72/08*    (2009.01)
*H04W 88/08*    (2009.01)
(Continued)

(52) U.S. Cl.
CPC .......... *H04W 72/082* (2013.01); *H04B 17/21* (2015.01); *H04B 17/309* (2015.01);
(Continued)

(58) Field of Classification Search
CPC ............. H04W 72/082; H04W 72/042; H04W 72/0453; H04W 16/14
See application file for complete search history.

(56) References Cited

U.S. PATENT DOCUMENTS

| 6,671,506 B1* | 12/2003 | Lee ................... H04M 15/8033 |
| | | 455/405 |
| 7,182,644 B2* | 2/2007 | Cherniski ............ H01R 13/719 |
| | | 439/620.21 |

(Continued)

FOREIGN PATENT DOCUMENTS

| JP | 3810618 B2 | 8/2006 |
| JP | 5670856 B2 | 2/2015 |
| KR | 10-1050880 B1 | 7/2011 |

*Primary Examiner* — Parth Patel
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Particularly, the present invention relates to an allocation and a user of a channel, and a method for operating a terminal comprises the steps of: receiving channel allocation information; and transmitting a data signal through at least one channel based on the channel allocation information. In addition, the present invention includes other examples different from the aforementioned example.

20 Claims, 22 Drawing Sheets

(51) Int. Cl.
  *H04L 1/18* (2006.01)
  *H04L 5/00* (2006.01)
  *H04W 16/14* (2009.01)
  *H04W 52/24* (2009.01)
  *H04W 72/04* (2009.01)
  *H04B 17/21* (2015.01)
  *H04B 17/309* (2015.01)
  *H04W 52/36* (2009.01)

(52) U.S. Cl.
  CPC .......... *H04L 1/1812* (2013.01); *H04L 5/0055* (2013.01); *H04L 5/0062* (2013.01); *H04L 5/0092* (2013.01); *H04W 16/14* (2013.01); *H04W 52/245* (2013.01); *H04W 72/042* (2013.01); *H04W 72/0453* (2013.01); *H04W 88/08* (2013.01); *H04L 5/0053* (2013.01); *H04W 52/367* (2013.01)

(56) References Cited

U.S. PATENT DOCUMENTS

| | | | |
|---|---|---|---|
| 7,944,990 B2* | 5/2011 | Lee | H04L 1/0041 375/295 |
| 8,165,580 B1* | 4/2012 | Kawasaki | H04W 48/20 375/144 |
| 8,700,045 B2* | 4/2014 | Li | H04W 72/082 455/449 |
| 8,825,066 B2* | 9/2014 | Roessel | H04W 72/0406 370/329 |
| 8,964,887 B2* | 2/2015 | Futatsugi | H04J 11/0036 375/296 |
| 9,924,368 B2* | 3/2018 | Valliappan | H04W 16/14 |
| 9,942,011 B2* | 4/2018 | Tang | H04L 25/03834 |
| 2002/0063653 A1* | 5/2002 | Oey | G01S 13/765 342/29 |
| 2003/0223452 A1* | 12/2003 | Toskala | H04W 52/50 370/442 |
| 2006/0126546 A1* | 6/2006 | Lee | H04B 7/2615 370/310 |
| 2007/0087772 A1* | 4/2007 | Yi | H04W 52/346 455/522 |
| 2007/0171809 A1 | 7/2007 | Pajukoski et al. | |
| 2009/0190541 A1* | 7/2009 | Abedi | H04W 16/10 370/329 |
| 2009/0190546 A1* | 7/2009 | Makino | H04L 1/0003 370/329 |
| 2010/0041413 A1* | 2/2010 | Sumasu | H04W 52/367 455/452.2 |
| 2010/0323743 A1* | 12/2010 | Huan | H04W 52/367 455/522 |
| 2011/0009070 A1* | 1/2011 | Wigren | H04B 17/345 455/67.13 |
| 2011/0032848 A1* | 2/2011 | Sagae | H04W 48/08 370/278 |
| 2011/0117967 A1* | 5/2011 | Vedantham | H04B 7/024 455/561 |
| 2011/0165903 A1* | 7/2011 | Selen | H04W 16/14 455/509 |
| 2011/0235586 A1* | 9/2011 | Han | H04B 7/0426 370/328 |
| 2012/0008549 A1* | 1/2012 | Yang | H04B 7/155 370/315 |
| 2012/0051315 A1* | 3/2012 | Wang | H04W 72/082 370/329 |
| 2012/0230263 A1* | 9/2012 | Nam | H04W 72/082 370/329 |
| 2013/0028346 A1* | 1/2013 | Hottinen | H04W 16/14 375/285 |
| 2013/0058432 A1* | 3/2013 | Futatsugi | H04J 11/0036 375/296 |
| 2013/0111235 A1* | 5/2013 | Yang | G06F 1/266 713/310 |
| 2013/0124888 A1* | 5/2013 | Tanaka | G11C 16/06 713/320 |
| 2013/0176953 A1* | 7/2013 | Stern-Berkowitz | H04W 52/146 370/329 |
| 2013/0196676 A1* | 8/2013 | Koudouridis | H04W 72/04 455/452.1 |
| 2013/0217429 A1* | 8/2013 | Kimura | H04W 16/14 455/509 |
| 2013/0308464 A1* | 11/2013 | Park | H04W 72/0406 370/241 |
| 2015/0003439 A1* | 1/2015 | Mitchell | H04L 5/0042 370/343 |
| 2015/0055563 A1* | 2/2015 | Zhu | H04W 52/243 370/329 |
| 2015/0078186 A1* | 3/2015 | Lagen Morancho | H04B 7/024 370/252 |
| 2015/0078483 A1* | 3/2015 | Sun | H04B 1/0475 375/297 |
| 2015/0085677 A1* | 3/2015 | Pourahmadi | H04L 5/0041 370/252 |
| 2015/0304090 A1* | 10/2015 | Ko | H04B 7/024 370/329 |
| 2015/0312838 A1* | 10/2015 | Torres | H04B 7/18582 370/329 |
| 2015/0334575 A1* | 11/2015 | Joshi | H04W 72/0453 370/329 |
| 2015/0341930 A1* | 11/2015 | Fitch | H04W 16/14 455/514 |
| 2016/0270028 A1* | 9/2016 | Lee | H04W 68/02 |
| 2016/0295538 A1* | 10/2016 | Sun | H04W 56/0045 |
| 2017/0034795 A1* | 2/2017 | Madan | H04W 52/243 |
| 2017/0094674 A1* | 3/2017 | Kobayashi | H04W 16/14 |
| 2017/0155471 A1* | 6/2017 | Madan | H04L 1/0015 |
| 2017/0280454 A1* | 9/2017 | Kusashima | H04J 3/00 |
| 2017/0290023 A1* | 10/2017 | Zhu | H04W 16/14 |
| 2017/0310447 A1* | 10/2017 | Kusashima | H04J 11/00 |
| 2017/0359827 A1* | 12/2017 | Kim | H04W 72/048 |
| 2018/0007673 A1* | 1/2018 | Fwu | H04W 4/70 |
| 2018/0027502 A1* | 1/2018 | Gacanin | H04W 24/02 370/252 |
| 2018/0110051 A1* | 4/2018 | Lee | H04L 5/00 |
| 2018/0124709 A1* | 5/2018 | Seo | H04W 52/30 |
| 2018/0146436 A1* | 5/2018 | Wang | H04L 5/0073 |

* cited by examiner

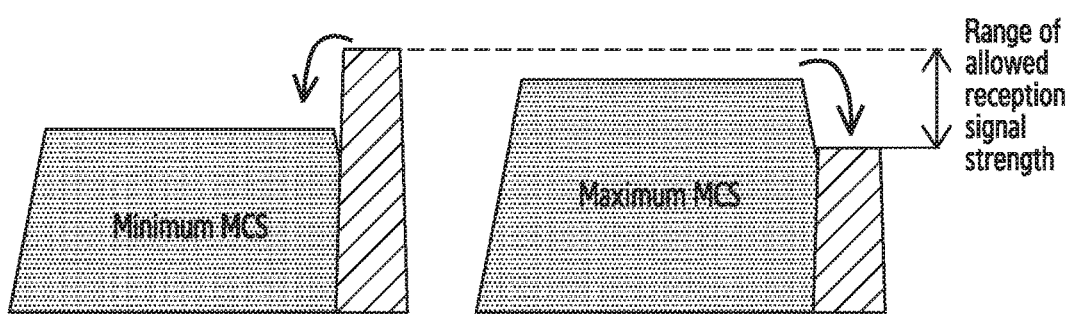
FIG.3A    FIG.3B
 : Signal strength of another system (305)
 : Signal strength of system of present invention (301)

CHANNEL ALLOCATION DEVICE AND METHOD IN WIRELESS COMMUNICATION SYSTEM

TECHNICAL FIELD

The present disclosure relates to channel allocation in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

DETAILED DESCRIPTION OF THE INVENTION

Technical Problem

An embodiment of the present disclosure provides a method and an apparatus for defining a channel in a communication system.

Another embodiment of the present disclosure provides a method and an apparatus for using channels defined in a guard band of another system, in a wireless communication system.

Another embodiment of the present disclosure provides a method and an apparatus for performing communication using channels defined in a guard band of another system, in a wireless communication system.

Another embodiment of the present disclosure provides a method and apparatus for reducing interference with another system, in a wireless communication system.

Another embodiment of the present disclosure provides a method and apparatus for allocating a channel based on the amount of interference between another system and a channel in a wireless communication system.

Technical Solution

An operation method of a terminal in a wireless communication system according to an embodiment of the present disclosure includes: receiving channel allocation information; and transmitting a data signal through at least one channel indicated by the channel allocation information.

An operation method of a base station in a wireless communication system according to an embodiment of the present disclosure includes: transmitting channel allocation information to a terminal; and receiving, from the terminal, a data signal through at least one channel indicated by the channel allocation information.

A terminal in a wireless communication system according to an embodiment of the present disclosure includes: a receiving unit configured to receive channel allocation information; and a transmitting unit configured to transmit a data signal through at least one channel indicated by the channel allocation information.

A base station in a wireless communication system according to an embodiment of the present disclosure includes: a transmitting unit configured to transmit channel allocation information to a terminal; and a receiving unit configured to receive, from the terminal, a data signal through at least one channel indicated by the channel allocation information.

Herein, the channel allocation information indicates at least one of a plurality of channels allocated to a guard band of another system, and the plurality of channels have classes determined based on the amount of interference from another system in the guard band.

Advantageous Effects

In a wireless communication system, channels are classified based on the amount of interference from another system that provides a guard band, whereby communication can be efficiently performed.

BRIEF DESCRIPTION OF THE DRAWINGS

FIG. 3 illustrates the allowed reception signal strength of a wireless communication system according to an embodiment of the present disclosure;

MODE FOR CARRYING OUT THE INVENTION

Figure 1:
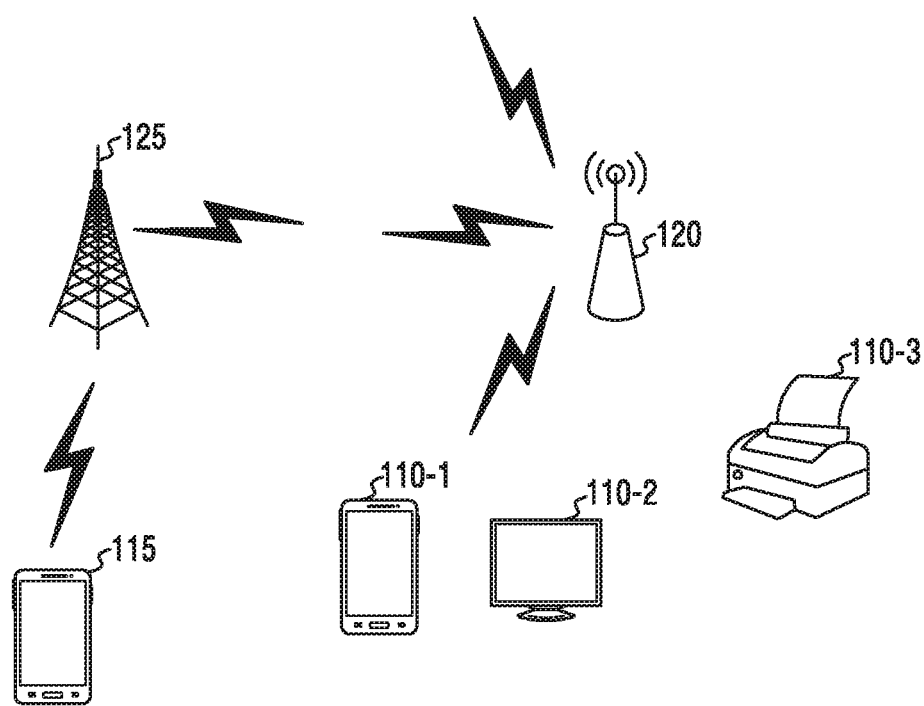
FIG. 1 illustrates a communication environment of a wireless communication system according to an embodiment of the present disclosure.

Hereinafter, the operating principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be made based on the contents throughout the specification.

The disclosure provided below will describe a technology for defining and allocating a channel in a wireless communication system. Particularly, the present disclosure will describe a technology for utilizing channels defined within a given band in a wireless communication system for the Internet of Things (IoT).

Hereinafter, the term indicating the characteristic of a channel, the term indicating the type of interference, the term indicating control information, the term (e.g., an event) indicating a change in a status, the term indicating a network entity, the term indicating messages, the term indicating an element of an apparatus, and the like, which are used in the following descriptions, are used for ease of description. Accordingly, the present disclosure is not limited to the following terms, and other terms having an equivalent technical meaning may be used.

For convenience of description, the present disclosure may use terms and names defined in the $3^{rd}$-Generation Partnership Project Long-Term Evolution (3GPP LTE) criteria. However, the present disclosure is not limited to the terms and the names, and may be equally applied to systems that comply with other criterias.

The IoT has attracted attention in various fields, and communication operators and vendors are developing various applications and systems using the IoT. Particularly, a cellular IoT (hereinafter referred to as 'CIoT') that uses a licensed frequency band allocated to a cellular system is drawing attention, among various IoT solutions. The cellular system is capable of providing more reliable communication than a non-cellular system, whereby reliable service can be provided. In association with CIoT, criteriaization is actively being conducted, such as evolved machine-type communication (eMTC), Global System for Mobile communications Enhanced Data rates for GSM Evolution Radio Access Network (GERAN) CIoT, or the like, and requirements of communication operators often hold decisive sway over determination of criterias due to the characteristics of criteriaization.

When CIoT is developed and embodied in a licensed band as opposed to an unlicensed band, the following advantages may be obtained. First, in an unlicensed band, an apparatus needs to detect whether a user who uses a channel exists before performing transmission and reception, and then transmits or receives a signal. Also, the probability of collision is high during transmission, and thus it is difficult to secure a desired quality of service (QoS). Second, frequencies of an unlicensed band do not belong to a predetermined operator, and thus it is difficult to establish a policy for charging for the use of frequencies.

On the other hand, to embody CIoT using a licensed band, the following difficulties may exist. First, most licensed bands are already used by predetermined systems, and it is difficult to immediately remove applications that are operated in each licensed band. Second, the prices for frequencies of a licensed band are very high, and currently, operators are already using allocated frequencies at high efficiency.

As described above, CIoT has various advantages when compared to IoT in an unlicensed band, but CIoT entails difficulties in securing a frequency band. Therefore, the present disclosure provides a technology for designing and operating CIoT using a guard band of a cellular system, such as LTE.

FIG. 1 illustrates a communication environment of a wireless communication system according to an embodiment of the present disclosure. Referring to FIG. 1, a cellular base station 125 and a cellular terminal 115 perform communication in a cellular system having a licensed band. Also, a base station 120 and terminals 110-1, 110-2, and 110-3 perform communication in a wireless communication system according to an embodiment of the present disclosure. The terminals 110-1, 110-2, and 110-3 may include electronic devices having a communication function (e.g., a cellular phone, a smart phone, a printer, a monitor, a television, or the like). Also, depending on the case, the terminals 110-1, 110-2, and 110-3 may be capable of accessing the cellular base station 125, and the cellular terminal 115 may be capable of accessing the base station 120.

The cellular system and the system according to the present disclosure may mutually interfere with each other. For example, the base station 125 and the base station 120 may be installed within a range that allows the base stations 120 and 125 to detect each other's signals, may exist in a location that allows the terminal 115 in the coverage area of the base station 125 to detect a signal from the base station 120, may exist in a location that allows the terminal 110-1 in the coverage area of the base station 120 to detect a signal from the base station 125, or may exist in a location that allows the terminal 110-1 in the coverage area of the base station 120 and the terminal 115 of the bases station 125 to detect each other's signals. Therefore, the system according to the present disclosure may need to be operated based on interference with the cellular system.

According to an embodiment of the present disclosure, a base station and a terminal may communicate using a guard band of an adjacent cellular system. That is, the system according to the present disclosure may provide a service through a band adjacent to an operating band of the cellular system. In this instance, mutual interference may be as shown in FIG. 2.

Figure 2A:
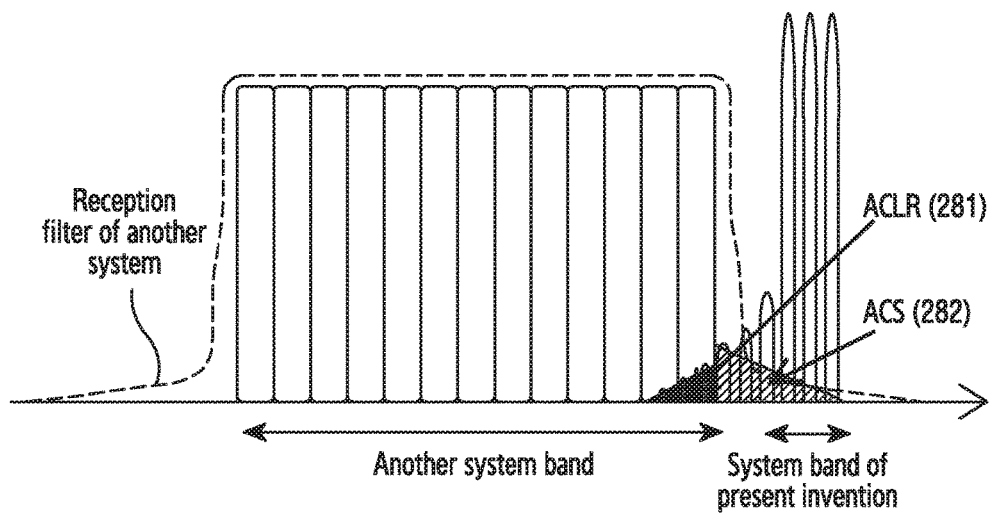
FIG. 2 illustrates forms of interference between a wireless communication system and a cellular system according to an embodiment of the present disclosure.
Figure 2B:
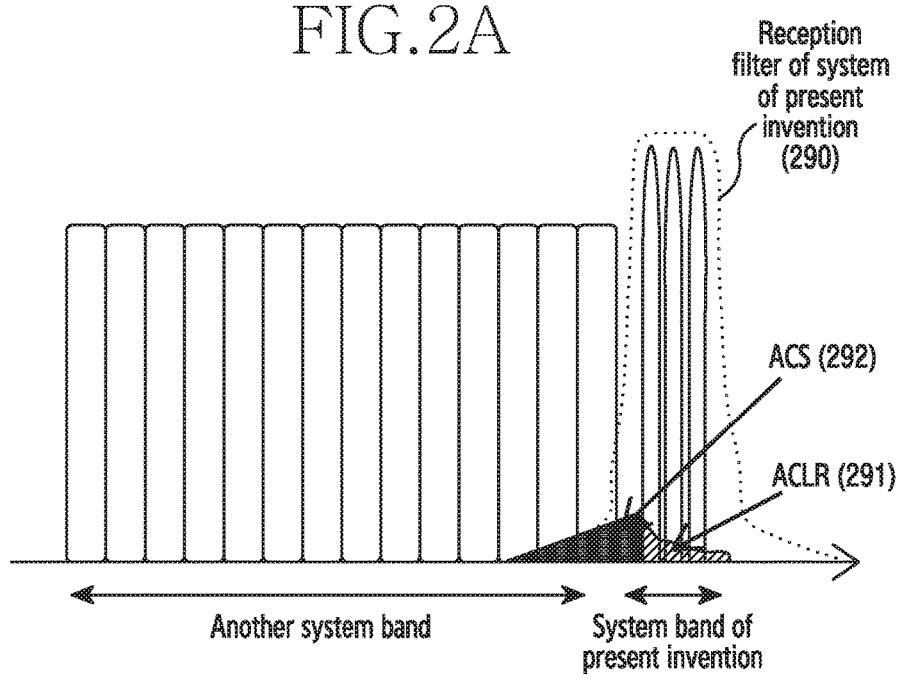

FIG. 2 illustrates forms of interference between a wireless communication system and a cellular system according to an embodiment of the present disclosure.

When the system according to the present disclosure uses a guard band of another system, the following features may be shown. First, another system and the system according to the present disclosure mutually interfere with each other. The system according to the present disclosure is deployed in a guard band of the other system and thus, the other system and the system according to the present disclosure may mutually interfere with each other. Particularly, referring to the diagram (a) of FIG. 2, the other system uses a reception filter to transmit and receive a signal within its band. In this instance, since the system according to the present disclosure uses an adjacent band, interference having a magnitude corresponding to an adjacent channel leakage ratio (ACLR) 281 may occur in a system band of the other system, and interference having a magnitude corresponding to adjacent channel selectivity (ACS) 282 may interfere with the system according to the present disclosure. The interference corresponding to ACS 282 may occur since the reception filter of the other system does not completely reject (perfectly rejection) interference with the system according to the present disclosure. The interference corresponding to ACLR 281 may occur since a transmission filter of the system according to the present disclosure does not completely reject the tail of a transmission signal of the system according to the present disclosure, and the tail is transferred to the other system.

Similarly, referring to the diagram (b) of FIG. 2, the system according to the present disclosure may use a reception filter 290 to transmit and receive a signal. In this instance, the system according to the present disclosure uses an adjacent band of another system, interference having a magnitude corresponding to ACLR 291 may occur in a guard band of the other system, and interference having a magnitude corresponding to ACS 292 may occur in a system band of the other system. The interference corresponding to ACS 292 may occur since the reception filter 290 of the system according to the present disclosure does not completely reject interference with the other system, and the interference corresponding to ACLR 291 may be transferred to the system according to the present disclosure since a transmission filter of the other system does not completely reject the tail of a transmission signal of the other system.

As described above, the reception filter and the transmission filter may not ideally remove an out-of-band signal, and thus the system according to the present disclosure and the other system may mutually interfere with each other. The other system has permission to use the system band, and thus the other system may need to adjust a signal strength such that the system according to the present disclosure that uses a guard band does not interfere with the system band. That is, the performance of the other system is not supposed to deteriorate due to the use of the guard band by the system according to the present disclosure. Accordingly, it is preferable that power control for reception power be performed with respect to the system according to the present disclosure. Accordingly, the range of allowed signal strength of the system according to the present disclosure may be defined as shown in FIG. 3.

FIG. 3 illustrates allowed reception signal strength of a wireless communication system according to an embodiment of the present disclosure. Referring to FIG. 3, when power control is performed, the upper limit and the lower limit of signal strength 301 according to the present disclosure may be determined based on the signal strength 305 of another system.

Particularly, the maximum transmission power may be determined based on interference of the system according to the present disclosure with the other system. The worst case, in which the interference of the system according to the present disclosure with the other system has the highest magnitude, is the case in which the other system uses the lowest modulation and coding scheme (MCS), and thus, the upper limit of signal strength is determined on the assumption that the other system applies the lowest MCS, as shown in the diagram (a). Also, the minimum amount of power required is determined taking into consideration the interference of the other system with the system according to the present disclosure, a modulation and coding scheme (MCS) of the system according to the present disclosure, or the amount of leakage interference from the other system. The worst case, in which the interference of the other system with the system according to the present disclosure has the highest magnitude, is the case in which the other system uses the highest MCS, and thus the lower limit of signal strength is determined on the assumption that the other system applies the maximum MCS, as shown in the diagram (b). Accordingly, power control needs to be performed such that the reception signal strength exists in a range between the upper limit and the lower limit.

The characteristics of an apparatus may be further taken into consideration when power control is performed. The system according to the present disclosure may include various terminals providing various applications. The characteristics of the applications may be as shown in FIG. 4.

Figure 4:
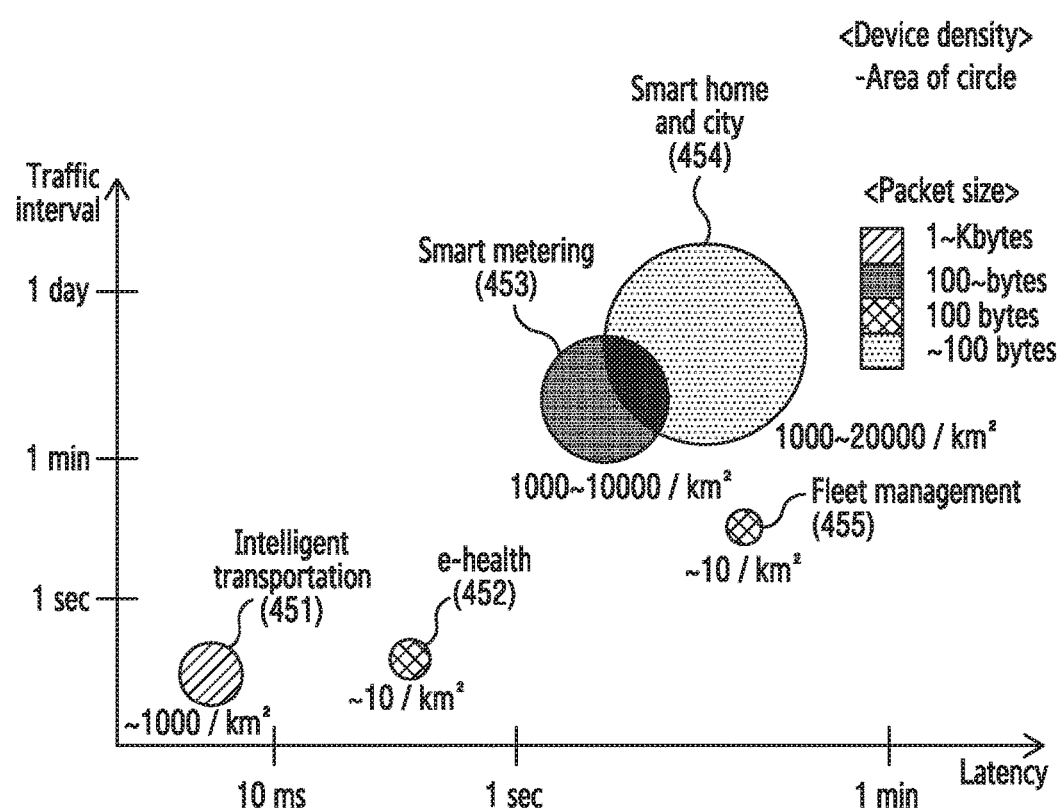
FIG. 4 illustrates examples of applications providable in a wireless communication system according to an embodiment of the present disclosure.

FIG. 4 illustrates examples of applications providable in a wireless communication system according to an embodiment of the present disclosure. According to FIG. 4, various applications are classified according to a traffic interval and a latency, and the packet size and the device density of each application are expressed. As illustrated in FIG. 4, various applications may be provided, such as those supporting intelligent transportation 451, electronic health (e-health) 452, smart metering 453, smart home and city 454, fleet management 455, or the like. In this instance, the required data rate may be different for each application. From among the various applications, an inexpensive terminal may not support power control. Alternatively, although a terminal supports power control, power control may be restricted under a predetermined situation (e.g., when a repeater of a cellular system exists nearby).

By taking into consideration above-described problems of interference, the present disclosure desires to overcome the technical problems as follows.

First, a channelization scheme that is specialized for the system according to the present disclosure that uses a guard band of another system has not been provided. Accordingly, when only a channel that supports all MCSs defined in the criteria is used, opportunities for using channels capable of sufficiently supporting terminals that do not need a high MCS may be lost. Also, when channels which do not support all MCSs defined in the criteria are operated according to the conventional scheme, interference with another system may occur, or the system according to the present disclosure may not show satisfactory performance.

Second, a terminal classification scheme that is specialized for the system according to the present disclosure that uses a guard band has not been provided. Accordingly, interference may occur among adjacent channels, or satisfactory performance may not be obtained.

Accordingly, the present disclosure provides a channelization and terminal classification rule, an operation scheme, and various embodiments associated therewith.

The system according to the present disclosure may provide an IoT service. According to the characteristics of the IoT service, a required data rate for transmitted and received information may be low. In this instance, it is preferable to divide a band into a plurality of narrow band channels and to use the same. In this instance, the maximum transmittable power and leakage power from another system may be different for each channel of the narrowband channels. Accordingly, the present disclosure may classify channels using the maximum allowed reception power, leakage power from the other system, and thermal noise variance, and may obtain a supportable quality for each channel (e.g., a signal to noise and interference ration (SINR)) using the above-described parameters. The maximum allowed reception power for each channel is determined based on a characteristic of a fast Fourier transform (FFT) reception filter of the other system. The characteristic of the FFT reception filter may be obtained from the central frequency and the bandwidth of an operating band of the other system. Also, when the other system and the system according to the present disclosure are co-located in the same place, the system according to the present disclosure may obtain a characteristic of a reception digital filter of the other system, and may obtain more precise maximum allowed reception power using the characteristics of the reception digital filter. For example, when the other system, which uses a band of 10 MHz, uses a 96-tap digital filter, the maximum allowed reception power, leakage power, and supportable channel quality may be as shown in FIGS. 5a to 5c.

Figure 5A:
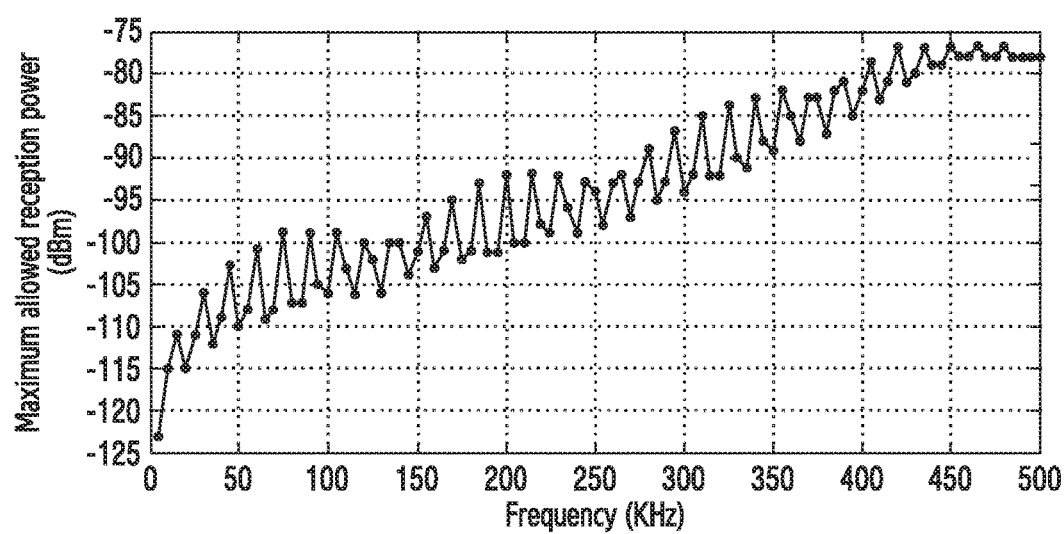
FIGS. 5A to 5C illustrate characteristics of a band used in a wireless communication system according to an embodiment of the present disclosure.
Figure 5B:
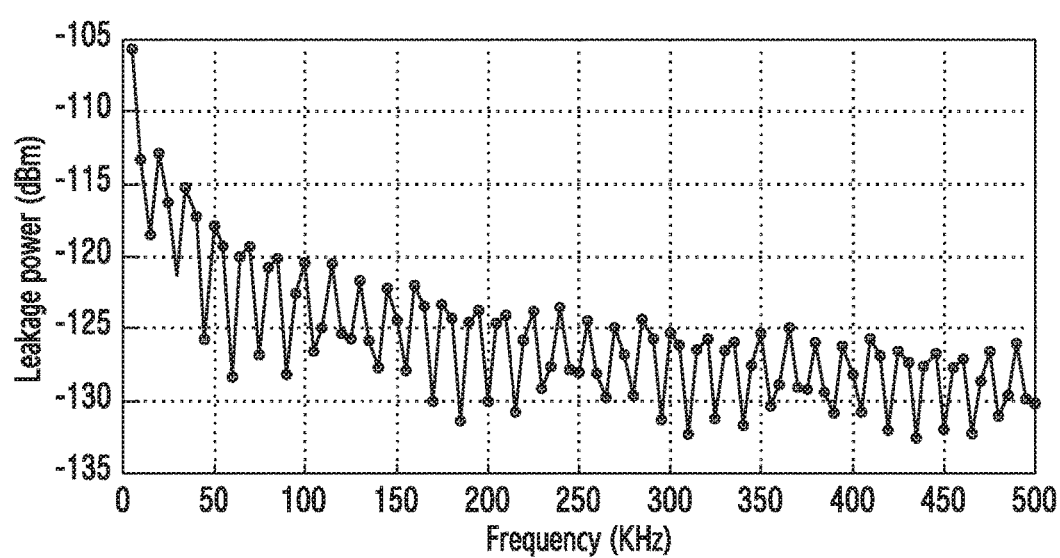
Figure 5C:
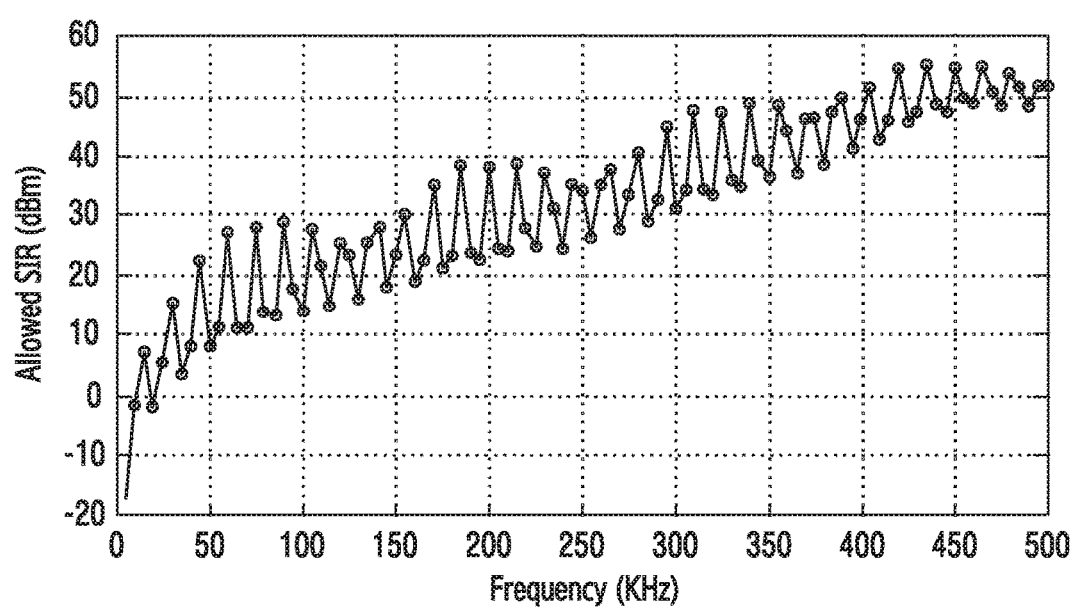

FIGS. 5a to 5c illustrate the characteristics of a band used by a wireless communication system according to an embodiment of the present disclosure. FIG. 5a illustrates the maximum allowed reception power of the system according to the present disclosure. FIG. 5b illustrates the leakage power from another system. FIG. 5c illustrates the supportable channel quality (e.g., signal to interference ratio (SIR)). As illustrated in FIG. 5a, the leakage power from the other system that uses a guard band tends to increase and decrease at intervals of a subcarrier of the other system. Accordingly, as illustrated in FIG. 5b, the maximum allowed reception power of the system according to the present disclosure that uses the guard band of the other system may also tend to increase and decrease at intervals of a subcarrier of the other system. Also, as illustrated in FIG. 5c, the supportable channel quality of the system according to the present disclosure may tend to increase and decrease at intervals of a subcarrier of the other system.

The maximum allowed reception power of FIG. 5a is calculated without taking into consideration out-of-band regulation of the other system. The out-of-band regulation indicates that the detection of signal power greater than or equal to a threshold value is not allowed in a band outside of a predetermined frequency range from an allowed band, when the allowed band is used. By taking into consideration the above-described out-of-band regulation, the maximum allowed reception power of FIG. 5a may be defined to show a tendency to decrease in an area that exceeds a predetermined frequency, as the frequency increases. Accordingly, the maximum allowed channel quality illustrated in FIG. 5c may be defined to show a tendency to decrease in an area that exceeds a predetermined frequency when a frequency increases.

Figure 6:
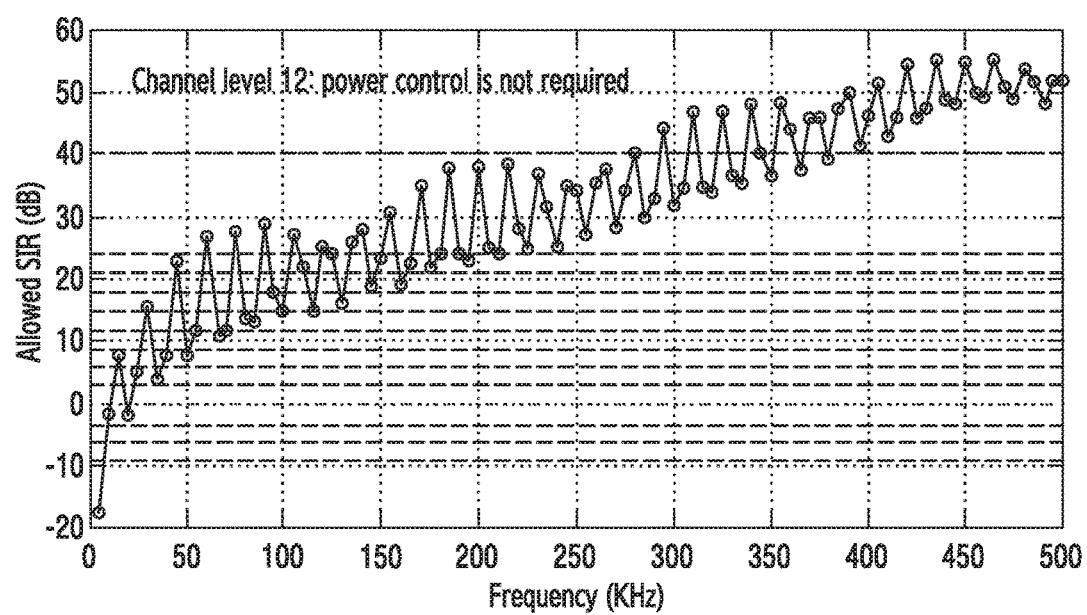
FIG. 6 illustrates an example of channel class classification in a wireless communication system according to an embodiment of the present disclosure.

The analysis result of FIGS. 5a to 5c may be determined through a simulation executed based on the central frequency of the other system that provides the guard band, FFT magnitude, or the like. Alternatively, the analysis result of FIGS. 5a to 5c may be determined based on the result obtained by actually measuring the signal of the other system that provides the guard band. Based on the analysis result of FIG. 5, channel classes may be classified based on the maximum allowed channel quality. That is, the magnitude of interference from the other system and an interference pattern for each frequency may be predictable. Therefore, the classes of channels to be defined in a band to be used (e.g., the guard band of the other system) may be defined in advance. For example, the channel classes may be classified as illustrated in FIG. 6. FIG. 6 illustrates an example of channel class classification in a wireless communication system according to an embodiment of the present disclosure. FIG. 6 illustrates channel classes defined as 12 classes. Referring to FIG. 6, channels are classified into 12 classes, and the class number is high when an SIR is high. For example, in the case of class 12, in which an allowed SIR is greater than or equal to 40 dB, power control may not be performed.

As illustrated in FIG. 6, channels may be distinguished on the frequency axis, and may be classified into a plurality of classes according to the maximum allowed channel quality. The channels may be classified to have an equal bandwidth in the band of the system according to the present disclosure. Each channel may occupy a narrowband that is narrower than an interval of a subcarrier of another system that provides the guard band. Alternatively, according to another embodiment of the present disclosure, each channel may be defined to have a bandwidth the same as an interval of a subcarrier of the other system that provides the guard band.

Although FIG. 6 illustrates 13 channel classes, the channels may be classified into a number of classes that is less than or equal to 12 or greater than or equal to 14 according to various embodiments of the present disclosure. In this instance, at least one channel may be allocated for transmitting a synchronization signal. Also, at least one channel may be allocated for transmitting control information (e.g., system information or the like). In this instance, it is preferable that a channel at a relatively better class be allocated for transmitting a synchronization signal or control information.

The channel classification of FIG. 6 may be expressed as given in Table 1 provided below.

TABLE 1

| Channel number | | | | | | | | | | | |
|---|---|---|---|---|---|---|---|---|---|---|---|
| | 1 | 2 | 3 | 4 | 5 | 6 | 7 | 8 | 9 | 10 | ... |
| Class | X | 2 | 5 | 2 | 4 | 8 | 4 | 5 | 10 | 5 | ... |

Based on the classification of FIG. 6, the maximum supportable MCS for each class may be defined as given in Table 2, shown below.

TABLE 2

| Class | Maximum supportable MCS |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 11 (control power is not required) |

According to the above-described channel classification, when the quality is high, in other words, when the amount of interference from the other system is low, a number indicating a class is high. According to the various embodiments of the present disclosure, the relationship between the amount of interference and a number indicating a class may be differently defined. Hereinafter, it is assumed that a number indicating a class is high when a channel is better. Hereinafter, for ease of description, a relatively better class having a high number is referred to as a 'high class' or 'upper class', and a relatively poor class having a low number is referred to as a 'low class' or 'lower class'.

In the system according to the present disclosure, terminals may be classified based on whether power control is allowed, the maximum required data rate, or the like. Here, whether power control is allowed may be determined based on whether a corresponding terminal has a power control function and on whether a terminal is in a state that allows the terminal to activate power control even when the terminal has the power control function. When an MCS of Table 2 is supported, terminals may be classified as given in Table 3 or Table 4 provided below.

TABLE 3

| Maximum required data rate | Power control is allowed | Power control is not allowed |
|---|---|---|
| 0 | A0 | B0 |
| 1 | A1 | B1 |
| 2 | A2 | B2 |
| 3 | A3 | B3 |
| 4 | A4 | B4 |
| 5 | A5 | B5 |
| 6 | A6 | B6 |
| 7 | A7 | B7 |
| 8 | A8 | B8 |
| 9 | A9 | B9 |
| 10 | A10 | B10 |
| 11 | A11 | B11 |

TABLE 4

| Current required data rate | Power control is allowed | Power control is not allowed |
|---|---|---|
| 0 | A0 | B0 |
| 1 | A1 | B1 |
| 2 | A2 | B2 |
| 3 | A3 | B3 |
| 4 | A4 | B4 |
| 5 | A5 | B5 |
| 6 | A6 | B6 |
| 7 | A7 | B7 |
| 8 | A8 | B8 |
| 9 | A9 | B9 |
| 10 | A10 | B10 |
| 11 | A11 | B11 |

When channel allocation is performed once initially in order to reduce overhead for initial access, it is preferable that terminals be classified based on the maximum required data rate. In this instance, the classification of Table 3 may be applied. Alternatively, when scheduling requests are made before data transmission, and a required data rate is included in the scheduling request, it is preferable that channel allocation be performed based on a current required MCS. Alternatively, when channel quality is reported and an MCS is determined by a base station, it is preferable that channel allocation be performed based on the current required MCS. In this instance, the classification of Table 4 may be applied.

As described above, when the guard band of the other system is used, the amount of leakage power from the other system may be recognized in advance. Accordingly, the characteristics of channels defined in the guard band, specifically, the maximum allowed power, allowed channel quality, or the like, may be determined in advance. Therefore, according to embodiments of the present disclosure, the base station may be made aware of the quality of channels in advance, and may utilize feedback information fed back from a terminal, and thus the base station can utilize resources according to the situation of the terminal. Also, the base station may be made aware of the quality of channels in advance, thereby increasing the efficiency of hybrid automatic repeat request (HARQ) retransmission. For example, the base station can reduce HARQ latency by allocating a relatively better channel for retransmission.

Figure 7:
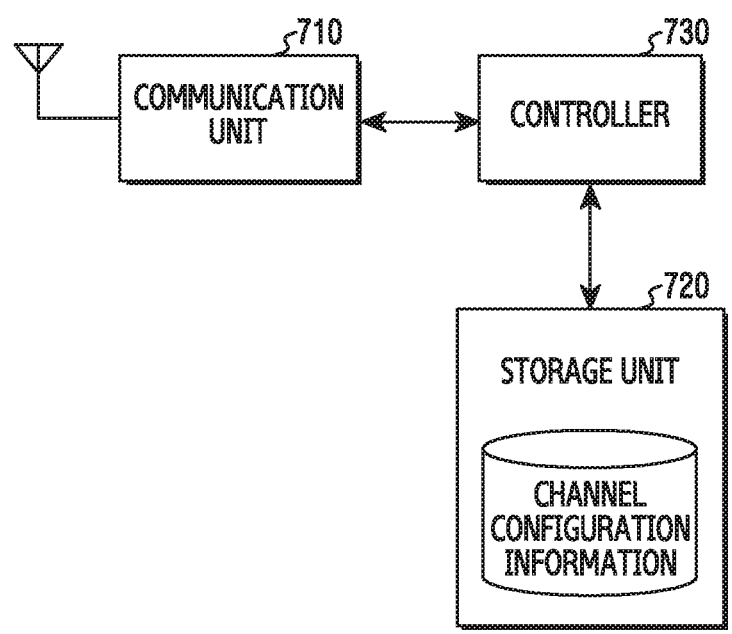
FIG. 7 illustrates a block diagram of a terminal in a wireless communication system according to an embodiment of the present disclosure.

FIG. 7 is a block diagram of a terminal in a wireless communication system according to an embodiment of the present disclosure. FIG. 7 illustrates the configuration of the terminal 110. The suffix "-unit" or "-er" used hereinafter may be a unit for processing at least one function or operation, and may be implemented as hardware, software, or a combination of hardware and software.

Referring to FIG. 7, the terminal includes a communication unit 710, a storage unit 720, and a controller 730.

The communication unit 710 executes functions for transmitting and receiving signals through a wireless channel. For example, the communication unit 710 performs a function of conversion between a baseband signal and a bit stream according to a physical layer criteria of the system. For example, when data is transmitted, the communication unit 710 generates complex symbols by encoding and modulating a transmission bit stream. Also, when data is received, the communication unit 710 restores a reception bit stream by demodulating and decoding a baseband signal. Also, the communication unit 710 up-converts a baseband signal into a radio-frequency (RF) band signal and transmits the same through an antenna, and down-converts an RF band signal received through an antenna into a baseband signal. For example, the communication unit 710 may include a transmission filter, a reception filter, an amplifier, a mixer, an oscillator, a digital-to-analog convertor (DAC), an analog-to-digital convertor (ADC), and the like. In addition, the communication unit 710 may include a plurality of communication modules for supporting a plurality of different radio access technologies.

The communication unit 710 may transmit and receive a signal as described above. Accordingly, the communication unit 710 may also be referred to as a transmitting unit, a receiving unit, or a transceiving unit. Also, the transmission and reception performed through a wireless channel, which is described in the following descriptions, may be understood to mean that the above-described processing is performed by the communication unit 710.

The storage unit 720 may store data, such as a basic program for operating a terminal, an application program, configuration information, and the like. The storage unit 720 may be configured as a volatile memory, a non-volatile memory, or a combination of a volatile memory and a non-volatile memory. Particularly, the storage unit 720 may store information associated with channel configuration. The channel configuration information is information associated with channels classified in the guard band of another system, and may define the relationship among a channel index, a channel class, and a frequency. In addition, the storage unit 720 may provide data stored therein in response to a request from the controller 730.

The controller 730 may control the overall operation of a terminal. For example, the controller 730 may transmit and receive signals through the communication unit 710. Further, the controller 730 records data in the storage unit 720 and reads the recorded data. To this end, the controller 730 may include at least one of a processor and a microprocessor, or may be a part of the processor. According to an embodiment of the present disclosure, the controller 730 may receive channel allocation information received from a base station, and may perform control such that data is transmitted or received based on the channel allocation information. For example, the controller 730 may perform control such that a terminal performs the procedure illustrated in FIGS. 9, 11, 12, 15, 16, 18, 19, and the like.

Figure 8:
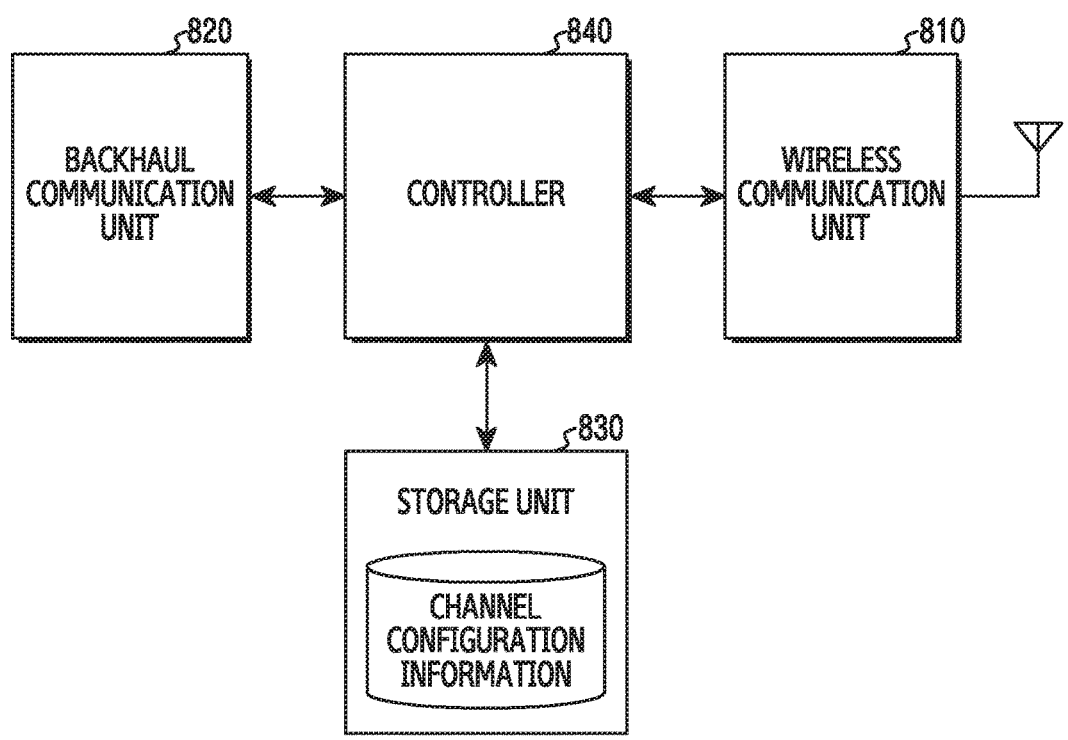
FIG. 8 illustrates a block diagram of a base station in a wireless communication system according to an embodiment of the present disclosure.

FIG. 8 illustrates a block diagram of a base station in a wireless communication system according to an embodiment of the present disclosure. FIG. 8 illustrates the configuration of the base station 120. The suffix "-unit" or "-er" used hereinafter may refer to a unit for processing at least one function or operation, and may be implemented as hardware, software, or a combination of hardware and software.

As illustrated in FIG. 8, the base station includes a wireless communication unit 810, a backhaul communication unit 820, a storage unit 830, and a controller 840.

The wireless communication unit 810 executes functions for transmitting and receiving signals through a wireless channel. For example, the wireless communication unit 810 performs a function of conversion between a baseband signal and a bit stream according to a physical layer criteria of the system. For example, when data is transmitted, the wireless communication unit 810 encodes and modulates a transmission bit stream so as to generate complex symbols. Also, when data is received, the wireless communication unit 810 restores a reception bit stream by demodulating and decoding a baseband signal. Also, the wireless communication unit 810 up-converts a baseband signal into a RF band signal and transmits the same through an antenna, and down-converts an RF band signal received through an antenna into a baseband signal. For example, the wireless communication unit 810 may include a transmission filter, a reception filter, an amplifier, a mixer, an oscillator, a DAC, an ADC, and the like.

Also, the wireless communication unit 810 may include a plurality of RF chains. In addition, the communication unit 810 may execute beamforming. To execute beamforming, the wireless communication unit 810 may adjust the phase and the size of each signal that is transmitted or received through a plurality of antennas or antenna elements.

The communication unit 810 may transmit and receive a signal as described above. Accordingly, the communication unit 810 may also be referred to as a transmitting unit, a receiving unit, or a transceiving unit. Also, the transmission and reception performed through a wireless channel, which is described in the following descriptions, may be understood to mean that the above-described processing is performed by the communication unit 810.

The backhaul communication unit 820 provides an interface for performing communication with other nodes within a network. That is, the backhaul communication unit 820 converts a bit stream transmitted from the base station to another node, for example, another access node, another base station, or a core network, into a physical signal, and converts a physical signal received from another node into a bit stream.

The storage unit 830 may store data, such as a basic program for operating a base station, an application program, configuration information, and the like. The storage unit 830 may be configured as a volatile memory, a non-volatile memory, or a combination of a volatile memory and a non-volatile memory. Particularly, the storage unit 830 may store information associated with channel configuration. The channel configuration information is information associated with channels classified in the guard band of another system, and may define the relationships between a channel index, a channel class, and a frequency. In addition, the storage unit 830 may provide data stored therein in response to a request from the controller 840.

The controller 840 may control the overall operation of the base station. For example, the controller 840 may transmit and receive signals through the wireless communication unit 810 or the backhaul communication unit 820. Further, the controller 840 records data in the storage unit

830 and reads the recorded data. To this end, the controller 840 may include at least one processor. According to an embodiment of the present disclosure, the controller 840 may allocate a channel to the terminal, transmit channel allocation information, and perform control such that data is transmitted or received through the allocated channel. For example, the controller 840 may perform control such that the base station performs procedures illustrated in FIGS. 10, 11, 13, 14, 15, 16, 17, 19, 20, and the like.

Figure 9:
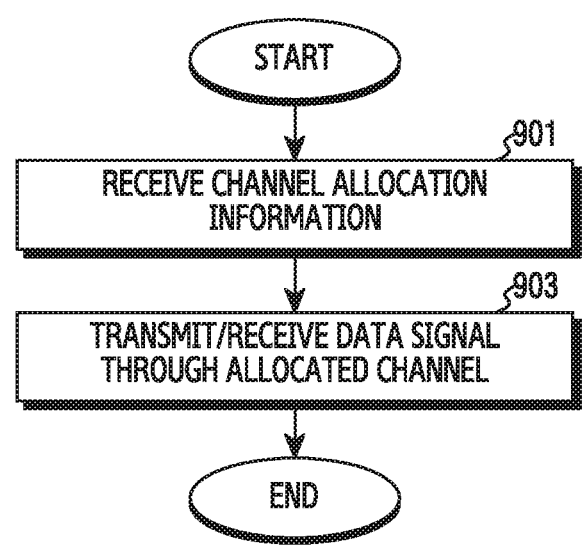
FIG. 9 illustrates an operation procedure of a terminal in a wireless communication system according to an embodiment of the present disclosure.

FIG. 9 illustrates an operation procedure of a terminal in a wireless communication system according to an embodiment of the present disclosure. FIG. 9 illustrates the operation method of the terminal 110.

Referring to FIG. 9, the terminal receives channel allocation information in operation 901. The channel allocation information indicates at least one channel allocated for the terminal. That is, the channel allocation information indicates at least one of a plurality of channels that distinguish a band used for the system according to the present disclosure on the frequency axis. Here, the band used for the system according to the present disclosure may include the entirety or a part of the guard band of another system. Each of the channels has a class determined based on interference from the other system, in other words, leakage power. That is, at least one channel indicated by the channel allocation information may be allocated based on a channel class. In addition, the at least one channel indicated by the channel allocation information may be allocated by further taking into consideration a difference in the amount of interference between channels, the number of retransmissions, a load state, channel quality, or the like.

Subsequently, the terminal proceeds with operation 903, and may transmit or receive a data signal through the allocated channel. Together with the channel allocation information, an MCS class may be indicated. In this instance, the terminal may generate a transmission signal by performing encoding and modulation according to the MCS class. Alternatively, the terminal may demodulate or decode a received signal according to the MCS class. Here, the MCS class is determined by a base station, and may be determined based on the amount of interference of the other system with the channel allocated to the terminal.

Figure 10:
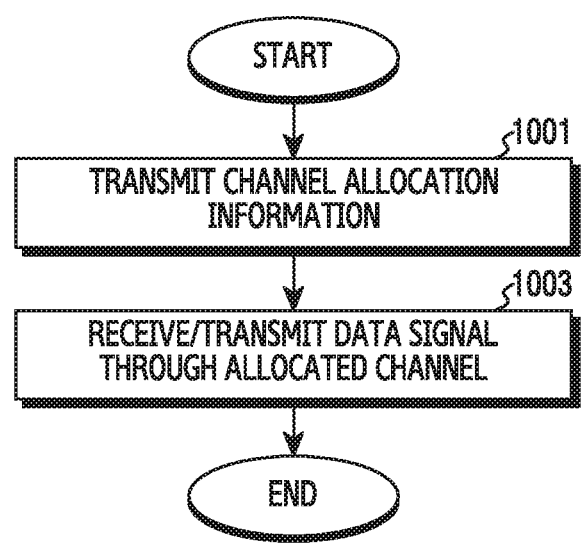
FIG. 10 illustrates an operation procedure of a base station in a wireless communication system according to an embodiment of the present disclosure.

FIG. 10 illustrates an operation procedure of a base station in a wireless communication system according to an embodiment of the present disclosure. FIG. 10 illustrates the operation method of the base station 120.

Referring to FIG. 10, the base station transmits channel allocation information in operation 1001. In other words, the base station allocates at least one of a plurality of channels to a terminal, and transmits information indicating the at least one allocated channel. That is, the channel allocation information indicates at least one of the plurality of channels that distinguish a band used for the system according to the present disclosure on the frequency axis. Here, the band used for the system according to the present disclosure may include the entirety or a part of the guard band of the other system. Each of the channels has a class determined based on interference from the other system, in other words, leakage power. That is, at least one channel indicated by the channel allocation information may be allocated based on a channel class. In addition, the at least one channel indicated by the channel allocation information may be allocated by further taking into consideration the difference in the amount of interference between channels, the number of retransmissions, a load state, channel quality, or the like.

Subsequently, the base station proceeds with operation 1003, and may transmit or receive a data signal through the allocated channel. Together with the channel allocation information, an MCS class may be indicated. In this instance, the base station may generate a transmission signal by performing encoding and modulation according to the MCS class. Alternatively, the base station may demodulate or decode a received signal according to the MCS class. To this end, the base station may determine the MCS class based on the amount of interference of the other system with the channel allocated to the terminal.

Figure 11:
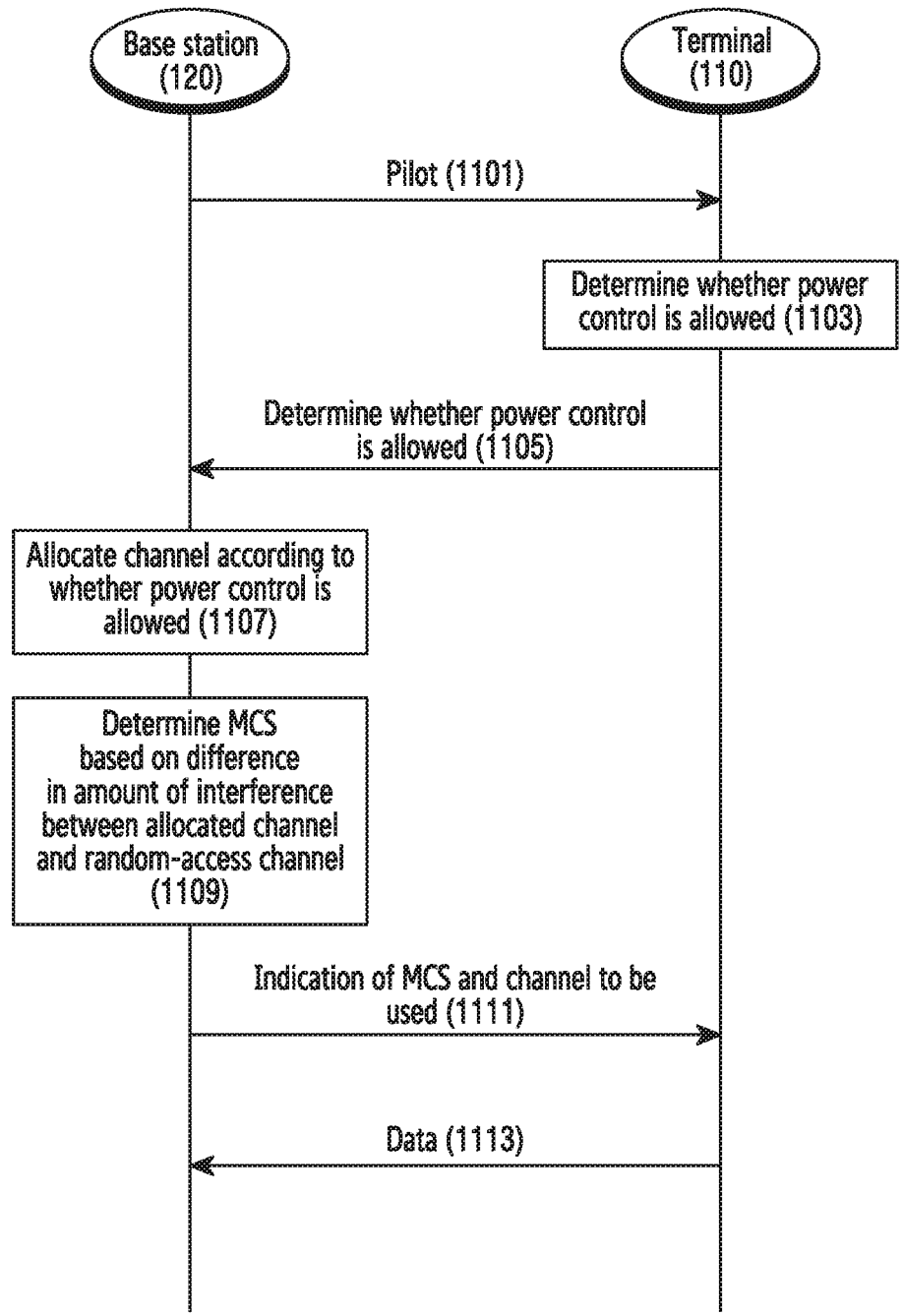
FIG. 11 illustrates an uplink communication procedure in a wireless communication system according to an embodiment of the present disclosure.

FIG. 11 illustrates an uplink communication procedure in a wireless communication system according to an embodiment of the present disclosure. FIG. 11 illustrates the operation method of the terminal 110 and the base station 120.

Referring to FIG. 11, the base station 120 may transmit a pilot signal and the terminal 110 may receive the pilot signal in operation 1101. The pilot signal is a signal of a predetermined value, which is transmitted through a resource previously agreed upon between the base station 120 and the terminal 110, and may be used for channel estimation, discovery/recognition of a system, or the like. The pilot signal may be referred to as a 'synchronization signal', 'preamble', 'training signal', or the like.

In operation 1103, the terminal 110 determines whether power control is allowed. Whether power control is allowed may be determined based on whether a power control function is included and on whether an environment allows power control. Particularly, the terminal 110 determines whether a power control function is supported. When the power control function is not supported, the terminal 110 determines that power control is not allowed. For example, the terminal 110 may determine whether the power control function is included based on content recorded in device information or the like. When the power control function is supported, the terminal 110 determines whether a situation allows power control. For example, whether the situation allows power control may be determine based on a signal from the base station 120 or an adjacent signal.

In operation 1105, the terminal 110 transmits, to the base station 120, information indicating whether power control is allowed. For example, the terminal 110 performs random access, and may transmit information indicating whether power control is allowed. Particularly, after successfully performing random access or while performing random access, the terminal 110 may transmit information indicating whether power control is allowed. Here, whether power control is allowed may be explicitly indicated, or may be indirectly indicated through parameters that represent various functions of the terminal 110. In this instance, the information indicating whether power control is allowed may be transmitted through a channel allocated for random access.

In operation 1107, the base station 120 allocates a channel to the terminal 110 based on whether power control is allowed. That is, a channel allocation process may be changed based on whether power control is allowed. According to an embodiment of the present disclosure, different channel allocation rules may be defined based on whether power control is allowed. For example, when power control is not allowed, the base station 120 may allocate a channel having quality better than or equal to the criteria. Conversely, when power control is allowed, the base station 120 may allocate the best channel from among allocable channels.

In operation 1109, the base station 120 may determine the MCS class to be applied to the terminal 110. In this instance, the base station 120 may determine the MCS class based on the difference in the amount of interference between the allocated channel and the random-access channel. The base station 120 may measure channel quality for the terminal 110 through a signal received in an initial access procedure (e.g., random access) of the terminal 110. However, when the amount of interference that another system applies to the allocated channel is different from that of the random-access channel, the quality of the channel between the base station 120 and the terminal 110 measured at the random-access channel may be different from the quality of the channel between the base station 120 and the terminal 110 measured at the allocated channel. Therefore, by taking into consideration the difference in the amount of interference between the allocated channel and the random-access channel, the base station 120 may select an MCS class lower than an MCS class corresponding to the channel quality measured at the random-access channel. In other words, the base station 120 may determine the MCS class based on the difference in the amount of interference between the channel at which channel quality of the terminal was measured in advance and the channel allocated for data transmission.

In operation 1111, the base station 120 transmits, to the terminal 110, information indicating the MCS class and the channel to be used. In other words, the base station 120 transmits resource allocation information including MCS allocation information and channel allocation information. Here, the resource allocation information may be transmitted through a channel allocated for control information from among the plurality of channels.

In operation 1113, the terminal 110 transmits a data signal to the base station 120. Particularly, the terminal 110 may generate a data signal by performing encoding and modulation according to the MCS class indicated by the MCS allocation information. The terminal 110 transmits the data signal through the channel indicated by the channel allocation information.

As illustrated in FIG. 11, the terminal 110 determines whether power control is allowed. As described above, whether power control is allowed may be determined based on whether a power control function is included and on whether an environment allows power control. For example, the terminal 110 may be an inexpensive device, and may be a device that does not include a power control function. Particularly, in the case in which an application that transmits data infrequently (e.g., once per day) is executed, it is preferable, from the perspective of overhead and network operation, that the device attempt to connect to a network temporarily when there is data to be transmitted, instead of maintaining a continuous connection, and that it report whether power control is allowed when data transmission is performed.

Even if the terminal is a device that does not have a power control function, there are various situations in which power control is not allowed. For example, when a repeater of another system is installed nearby, the device may not perform power control. The repeater may be controlled by an automatic gain controller, whereby the power class of an output signal may be maintained regular, irrespective of the power of a received signal. For example, although a signal input to the repeater changes in a range from −60 dBM to −30 dBm, an output signal may always have power of a fixed value (e.g., 10 dBm). Generally, the repeater may amplify a signal in a guard band as well as an in-band signal. Therefore, when the power of the in-band signal is low in the signal received by the repeater, the power of the signal in the guard band in the amplified signal is high. For example, in the case in which the output of the repeater is 10 W, when the power of the in-band signal in the signal received by the repeater is 3 W and the power of the signal in the guard band is 2 W, the power of the in-band signal in an output signal of the repeater becomes 6 W and the power of the signal in the guard band becomes 4 W. Conversely, in the case in which the output of the repeater is 10 W, when the in-band signal does not exist in the signal received by the repeater and the power of the signal in the guard band is 2 W, the power of the in-band signal in an output signal of the repeater becomes 0 W and the power of the signal in the guard band becomes 10 W. That is, according to the presence of an in-band signal of another system, the power of the signal that arrives at the terminal 110 may change even though the same value is applied as the input power of a signal of the system according to the present disclosure that uses the guard band.

When the power of the signal received from the base station 120 changes dramatically, the terminal 110 may not predict the gain of the channel with the base station 120 and, accordingly, power control may not be performed. Also, even if power control is performed, the terminal 110 may not maintain regular power. Therefore, the terminal 110 may determine whether power control is allowed according to variation in the power of the signal received from the base station 120. In other words, the terminal 110 may determine whether a repeater for another system is installed nearby, based on variation in the power of the signal received from the base station 120.

Figure 12:
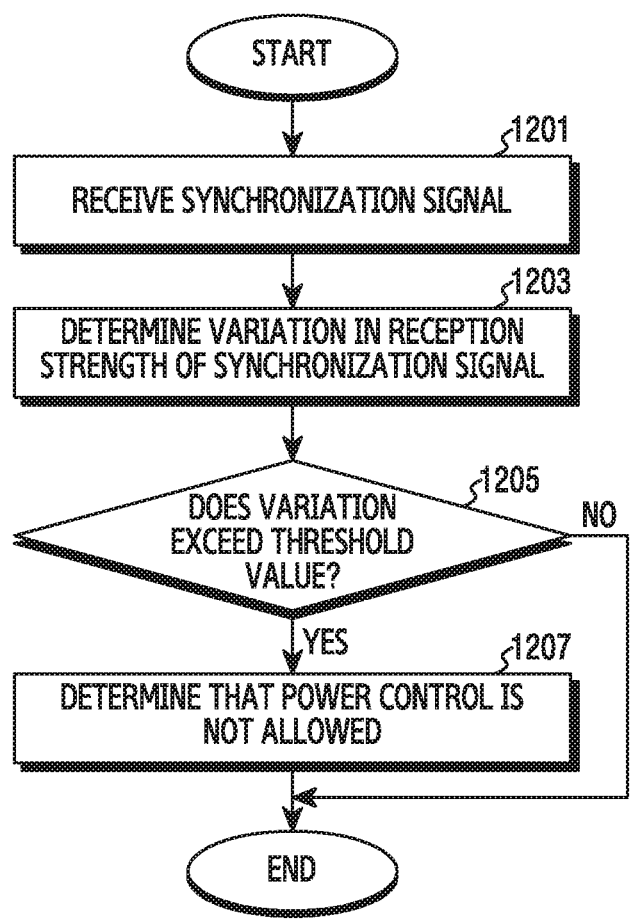
FIG. 12 illustrates a procedure of determining whether power control is allowed in a wireless communication system according to an embodiment of the present disclosure.

FIG. 12 illustrates a procedure of determining whether power control is allowed in a wireless communication system according to an embodiment of the present disclosure. FIG. 12 illustrates the operation method of the terminal 110. FIG. 12 illustrates a method by which a terminal that supports a power control function determines whether a situation allows power control. The procedure of FIG. 12 may be included in operation 1103 of FIG. 11.

Referring to FIG. 12, the terminal receives a synchronization signal in operation 1201. The synchronization signal is a signal of a predetermined value, which is transmitted through a resource previously agreed upon between a base station and a terminal, and may be used for channel estimation, discovery/recognition of a system, or the like. The synchronization signal may be referred to as a 'pilot signal', 'preamble', 'training signal', or the like. The synchronization signal may be received through a channel allocated for random access or control information.

Subsequently, the terminal proceeds with operation 1203, and determines variation in the reception strength of the synchronization signal. That is, the terminal may repeatedly detect a synchronization signal, and may measure the reception strength of the synchronization signal, in other words, reception power. The terminal may calculate variation in the reception strength. Here, the variation in the reception strength may be calculated in the form of a difference in reception strength between a previous reception point and a current reception point, a difference between the maximum value and the minimum value of reception strengths measured during a predetermined interval, a variance or a criteria deviation of a plurality of reception strengths, or the like.

Subsequently, the terminal proceeds with operation 1205, and may determine whether the variation in reception strength exceeds a threshold value. In other words, the terminal may compare the variation in reception strength with a predetermined threshold value. Depending on the case, operation 1205 may be expressed as, or may be replaced with, a process of determining whether a repeater of another system that provides a guard band is installed nearby. When a repeater is installed nearby, the reception strength of a signal from a base station may vary dramatically according to cell loading of the other system. Therefore, the terminal may determine whether the variation in the reception strength is greater than or equal to a predetermined class.

When the variation in the reception strength exceeds the threshold value, the terminal proceeds with operation 1207, and determines that the situation does not allow power control. For example, the terminal determines that a repeater of another system is installed nearby. Accordingly, although not illustrated in FIG. 12, the terminal may transmit, to the base station, information indicating that power control is not allowed.

Figure 13:
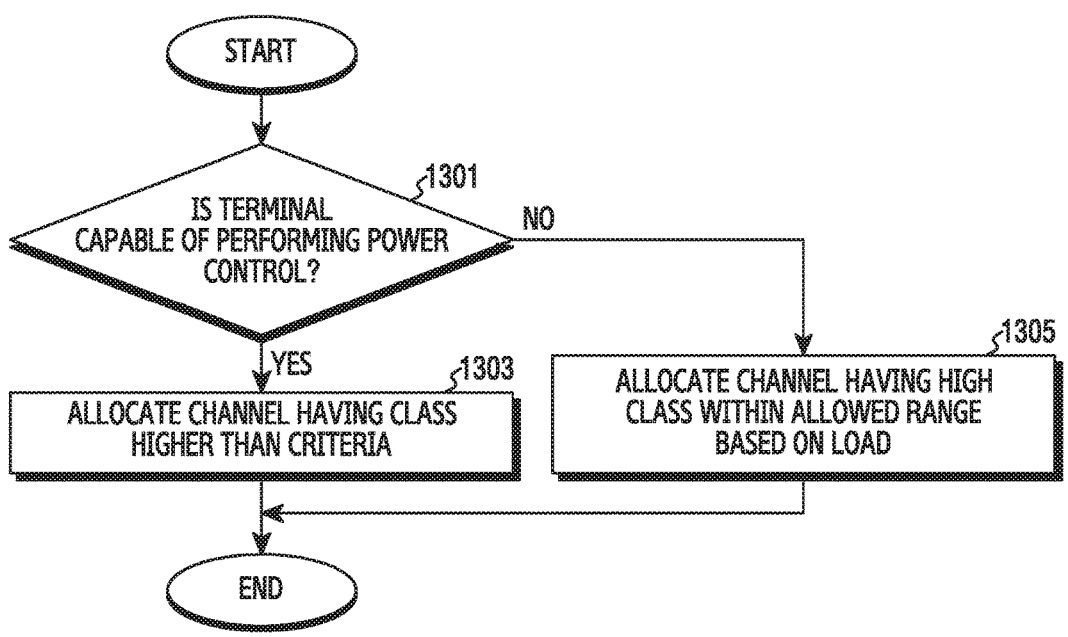
FIG. 13 illustrates a channel allocation procedure in a wireless communication system according to an embodiment of the present disclosure.

FIG. 13 illustrates a channel allocation procedure in a wireless communication system according to an embodiment of the present disclosure. FIG. 13 illustrates the operation method of the base station 120. The procedure of FIG. 13 may be included in operation 1107 of FIG. 11.

Referring to FIG. 13, the base station determines whether a terminal is capable of performing power control in operation 1301. In other words, the base station determines whether the terminal to which a channel is to be allocated supports power control. Whether the terminal supports power control may be determined through control information received from the terminal.

When the terminal supports power control, the base station proceeds with operation 1303 and allocates a channel having a class higher than or equal to the criteria. The criteria may be defined differently according to concrete embodiments. For example, the base station may allocate, to the terminal, the channel having the highest class (e.g., class 12 of FIG. 6). When all channels are used, the base station collects a high-class channel that has been allocated to a terminal capable of performing power control, and reallocates the collected channel to a terminal incapable of performing power control. That is, the terminal incapable of performing power control may have a higher priority than the terminal capable of performing power control.

Conversely, when the terminal does not support power control, the base station proceeds with operation 1305 and allocates, to the terminal, a high-class channel within an allowed range based on a load state. In other words, the base station allocates a channel to an available terminal based on a channel usage state. For example, the base station identifies channels that are not currently used, and may allocate a channel having the highest class from among the identified channels to the terminal. That is, unless the case corresponds to full loading, the base station may start allocation from an excellent channel, in other words, a high-class channel.

Figure 14:
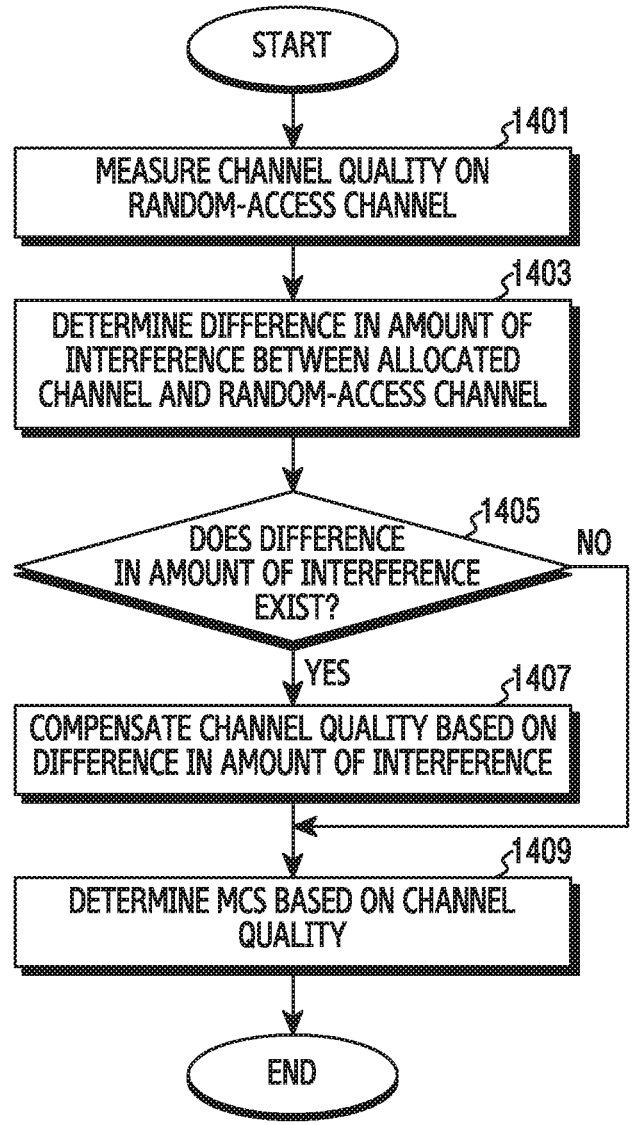
FIG. 14 illustrates a procedure of determining a modulation and coding scheme (MCS) in a wireless communication system according to an embodiment of the present disclosure.

FIG. 14 illustrates a procedure of determining an MCS in a wireless communication system according to an embodiment of the present disclosure. FIG. 14 illustrates the operation method of the base station 120. A part of the procedure of FIG. 14 may be included in operation 1109 of FIG. 11.

Referring to FIG. 14, the base station measures channel quality on a random-access channel in operation 1401. A terminal attempts random access through the random-access channel in order to access the base station. In other words, the terminal attempts contention-based access by transmitting a sequence for random access. Here, the sequence may be referred to as a 'random-access signal' or a 'random-access preamble'. In this instance, the base station may measure the quality of the channel with the terminal using a signal received in an initial access procedure.

Subsequently, the base station proceeds with operation 1403, and determines a difference in the amount of interference between an allocated channel and the random-access channel. That is, although not illustrated in FIG. 14, the base station allocates, to the terminal, at least one of channels excluding the random-access channel. The amount of interference that another system applies to channels that may be used for communication between the terminal and the bases station, that is, leakage power, may be predicted in advance, since a guard band is used. Therefore, the base station identifies the amount of interference of the random-access channel and the amount of interference of the allocated channel, and may calculate the difference in the amount of interference between the channels.

Subsequently, the base station proceeds with operation 1405, and determines whether a difference in the amount of interference exists. In other words, the base station determines whether the amount of interference is 0. In other words, the base station may determine whether the amount of interference of the random-access channel and the amount of interference of the allocated channel is the same. In this instance, according to a detailed embodiment, when the difference is less than a threshold value, it is considered that the amount of interference of channels are equal. When there is no difference in the amount of interference, the base station omits operation 1407.

Conversely, when there is a difference, the base station proceeds with operation 1407, and compensates channel quality based on the difference in the amount of interference. When the amount of interference of the random-access channel and the amount of interference of the allocated channel are different, the channel quality measured at the random-access channel may not be maintained at the allocated channel. The channel quality varies based on the amount of interference. Therefore, the base station may compensate the channel quality in advance by a predicted difference in the amount of interference. In the case in which the amount of interference of the random-access channel is less than the amount of interference of the allocated channel, when the difference in the amount of interference is high, the channel quality may be compensated to be low.

Subsequently, the base station proceeds with operation 1409, and determines an MCS class based on the channel quality. The MCS class may be determined based on a predetermined relationship between channel quality and an MCS class. That is, the relationship defines the minimum channel quality required when each MCS class is applied. In this instance, when it is identified that a difference in the amount of interference exists in operation 1405, the base station determines the MCS class based on the channel quality compensated in operation 1407. Therefore, when operation 1407 is performed, a lower MCS class may be selected than the case in which operation 1407 is not performed.

Figure 15:
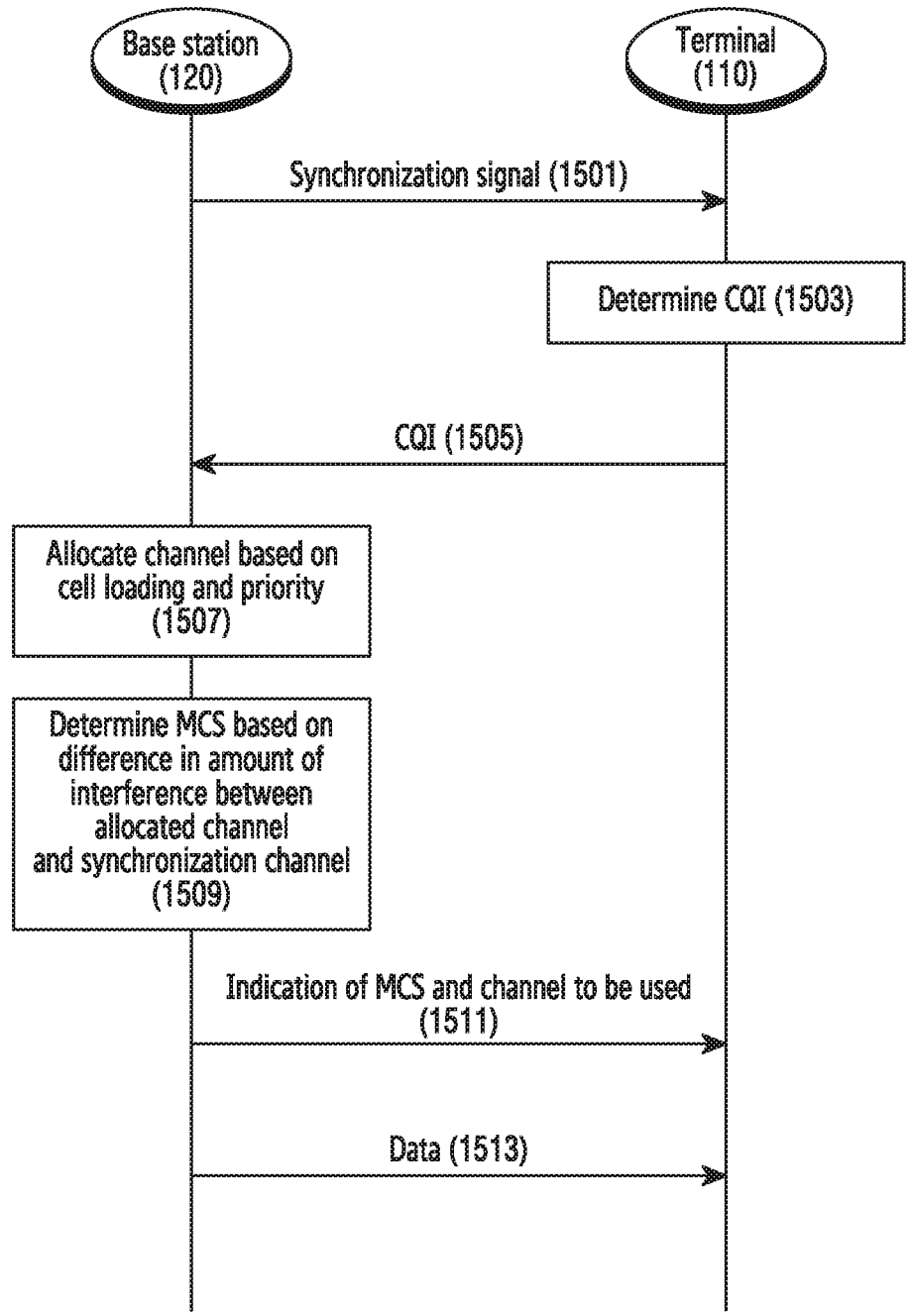
FIG. 15 illustrates a downlink communication procedure in a wireless communication system according to an embodiment of the present disclosure.

FIG. 15 illustrates a downlink communication procedure in a wireless communication system according to an embodiment of the present disclosure. FIG. 15 illustrates the operation method of the terminal 110 and the base station 120.

Referring to FIG. 15, the base station 120 may transmit a synchronization signal, and the terminal 110 may receive a pilot signal in operation 1501. The pilot signal is a signal of a predetermined value, which is transmitted through a resource previously agreed upon between the base station 120 and the terminal 110, and may be used for channel estimation, discovery/recognition of a system, or the like. The pilot signal may be referred to as a 'pilot signal', 'preamble', 'training signal', or the like. The synchronization signal may be received through a synchronization channel allocated for a synchronization signal. The synchronization channel may be commonly used as a channel allocated for random access or control information.

In operation 1503, the terminal 110 determines a channel quality indicator (CQI). That is, the terminal 110 measures the channel quality of a radio link between the base station 120 and the terminal 110 using the synchronization signal, and generates control information indicating the channel quality. The CQI may include an index representing channel quality. Here, the channel quality may include at least one of a signal to noise ratio (SNR), a signal to interference and noise ratio (SINR), a carrier to interference and noise ratio (CINR), and a signal to interference ratio (SIR). In this instance, the CQI may indicate channel quality on the synchronization channel.

In operation 1505, the terminal 110 transmits the CQI to the base station 120. In other words, the terminal 110 transmits control information indicating channel quality. The CQI may be transmitted through the channel allocated for control information. That is, the terminal 110 identifies the frequency of the channel allocated for the control information, and transmits control information through the identified channel.

In operation 1507, the base station 120 allocates a channel to the terminal 110 based on cell loading and the priority of the terminal 110. Here, various criteria may be used to assign a priority. For example, the priority may be assigned based on whether power control is allowed, which has been described with reference to FIG. 11. Alternatively, the priority may be assigned based on a characteristic (e.g., a required data rate, a traffic generation period, or the like) of an application executed in the terminal 110. For example, although high-class channels are all used, when a device that has a lower priority than that of the terminal 110 is currently used, the base station 120 collects a high-class channel, and reallocates the collected channel to the terminal 110.

In operation 1509, the base station 120 may determine an MCS class to be applied to the terminal 110. In this instance, the base station 120 may determine the MCS class based on the difference in the amount of interference between the allocated channel and the synchronization channel. The base station 120 may identify the channel quality that the terminal 110 measures at the synchronization channel based on the CQI received in operation 1505. However, when the amount of interference that another system applies to the allocated channel is different from the amount of interference of a random-access channel, the quality of the channel between the base station 120 and the terminal 110 measured at the synchronization channel may be different from the quality of the channel between the base station 120 and the terminal 110 measured at the allocated channel. Therefore, by taking into consideration the difference in the amount of interference between the allocated channel and the random-access channel, the base station 120 may select an MCS class lower than an MCS class corresponding to the channel quality measured at the random-access channel.

In operation 1511, the base station 120 transmits, to the terminal 110, information indicating the MCS class and a channel to be used. In other words, the base station 120 transmits resource allocation information including MCS allocation information and channel allocation information. Here, the resource allocation information may be transmitted through a channel allocated for control information from among the plurality of channels.

In operation 1513, the base station 120 transmits a data signal to the terminal 110. In particular, the base station 120 generates the data signal by performing encoding and modulation according to an MCS class indicated by the MCS allocation information, and transmits the data signal through a channel indicated by the channel allocation information. Accordingly, the terminal 110 receives the data signal through the channel indicated by the channel allocation information, and may performs demodulation and decoding according to the MCS class indicated by the MCS allocation information.

Figure 16:
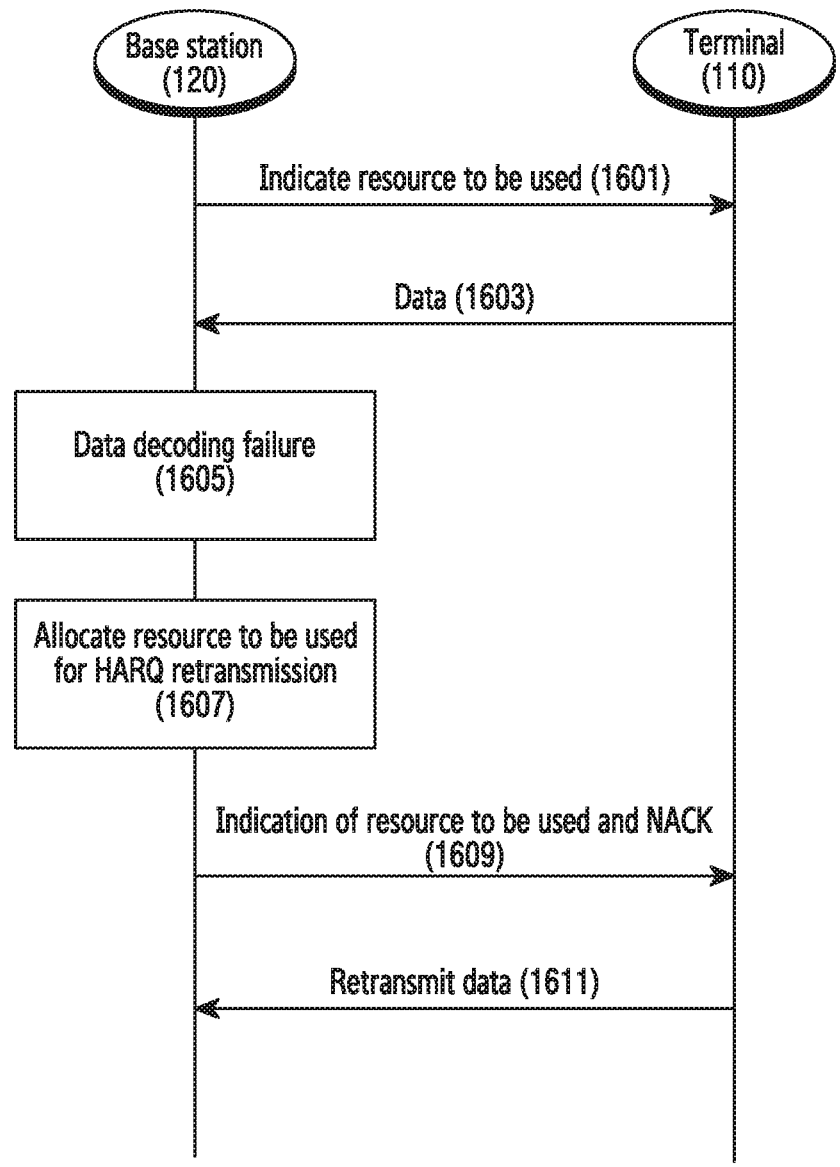
FIG. 16 illustrates a data retransmission procedure in a wireless communication system according to an embodiment of the present disclosure.

FIG. 16 illustrates a data retransmission procedure in a wireless communication system according to an embodiment of the present disclosure. FIG. 16 illustrates the operation method of the terminal 110 and the base station 120.

Referring to FIG. 16, the base station 120 transmits, to the terminal 110, information indicating an MCS class and a channel to be used in operation 1601. In other words, the base station 120 transmits resource allocation information including MCS allocation information and channel allocation information. Here, the resource allocation information may be transmitted through a channel allocated for control information from among the plurality of channels.

In operation 1603, the terminal 110 transmits a data signal to the base station 120. Particularly, the terminal 110 may generate the data signal by performing encoding and modulation according to the MCS class indicated by the MCS allocation information. The terminal 110 transmits the data signal through a channel indicated by the channel allocation information.

In operation 1605, the base station 120 demodulates and decodes the data signal, and determines that decoding fails. That is, the base station 120 receives the data signal through the channel indicated by the channel allocation information, and may performs demodulation and decoding according to the MCS class indicated by the MCS allocation information. However, as the result of checking an error of the decoded data, the base station 120 determines that an error occurs. For example, the base station 120 may perform error check using a cyclic redundancy check (CRC) bit.

In operation 1607, the base station 120 may allocate a resource to be used for HARQ retransmission. In other words, the base station 120 allocates a channel to be used for retransmission by the terminal 110. In this instance, classes of channels are determined based on the leakage power of another system that provides a guard band, and thus the base station 120 may select a channel for retransmission using the channel classes. The detailed rule for selecting a channel for retransmission may be changed according to various embodiments. Furthermore, the rule for selecting a channel for retransmission may be defined differently based on the number of retransmissions. For example, the base station 120 may select a high-class channel, that is, a better channel, than the channel that was used for initial transmission.

In operation 1609, the base station 120 transmits information indicating the channel to be used and a non-acknowledge (NACK) signal. In other words, the base station 120 indicates retransmission by providing notification of failure of data decoding. The base station 120 transmits channel allocation information indicating the channel allocated for retransmission. In addition, the base station 120 may further transmit information indicating an MCS class. Here, the NACK signal and the channel allocation information may be transmitted through the channel allocated for control information from among the plurality of channels.

In operation 1611, the terminal 110 transmits a retransmission data signal to the base station 120. Specifically, the terminal 110 generates the retransmission data signal by encoding and modulating retransmission data. In this instance, the retransmission data may include a different version of parity bits from that of initial transmission data (e.g., data transmitted in operation 1603), or may include the same signal. The terminal 110 transmits the retransmission data signal through a channel indicated by the channel allocation information.

As described above, a rule for selecting a channel for retransmission may be variously defined. For example, the rule may be defined to allocate a higher-class channel when decoding error occurs in the same data at least a predetermined number of times. Here, the predetermined number of times may be defined as a number greater than or equal to 1. Particularly, the higher-class channel may be a channel having a class as high as the predetermined number of classes (e.g., 1 class, 2 classes, or the like), or may be a channel having the highest class.

Furthermore, the base station may sequentially change channel classes based on the number of retransmissions. For example, the base station may allocate a channel having a high class when one decoding error occurs, and may allocate a channel having a higher class when two decoding errors occur. Alternatively, the base station increases the class of an allocated channel every N times a decoding error occurs (e.g., every 2 times). In this instance, the channel class corresponding to the number of times that an error occurs may be defined in advance, or the degree of increase in a class that corresponds to the number of times an error occurs may be defined in advance.

Figure 17:
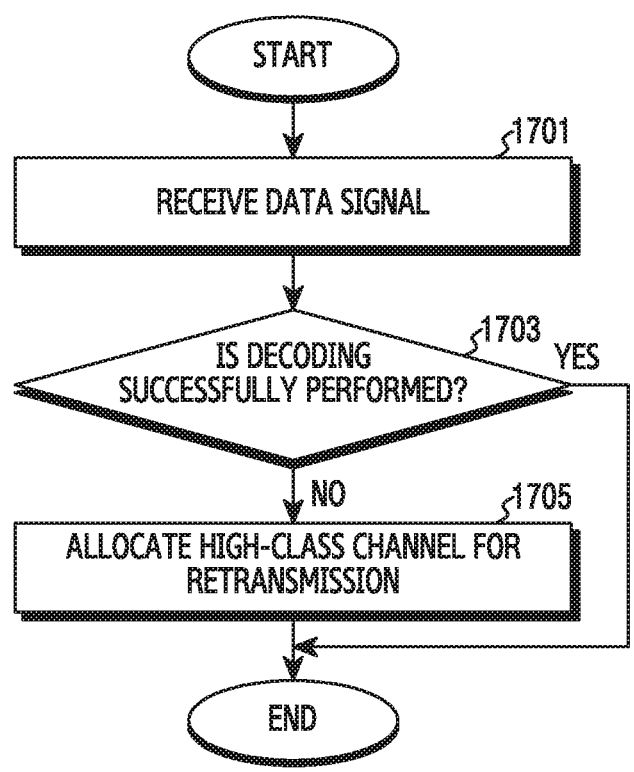
FIG. 17 illustrates a channel allocation procedure for data retransmission in a wireless communication system according to an embodiment of the present disclosure.

FIG. 17 illustrates a channel allocation procedure for data retransmission in a wireless communication system according to an embodiment of the present disclosure. FIG. 17 illustrates the operation method of the base station 120.

Referring to FIG. 17, the base station includes a data signal in operation 1701. The data signal is received through a channel allocated by the base station. In this instance, the data signal may include initial transmission data, or may include retransmission data.

Subsequently, the base station proceeds with operation 1703 to decode the data, and determines whether decoding was successfully performed. That is, the base station performs error checking of the decoded data and determines whether an error occurs. For example, the base station may perform error checking using a CRC bit added to the data. When decoding is successfully performed, the base station terminates the present procedure. Accordingly, the base station may receive subsequent data.

Conversely, when decoding fails, the base station proceeds with operation 1705 and allocates a channel having a high class for retransmission. That is, the base station changes the channel allocated to the terminal according to a rule for selecting a channel for retransmission, and accordingly allocates a channel having a higher class than that of the channel used in operation 1703. In other words, the base station determines that the channel class needs to be changed due to the decoding failure determined in operation 1703, and allocates a channel having a higher class than that of the channel used in operation 1703. In this instance, the degree of increase in a class may be changed based on the detailed content of the rule. Accordingly, although not illustrated in FIG. 17, the base station transmits channel allocation information and a NACK to the terminal.

Figure 18:
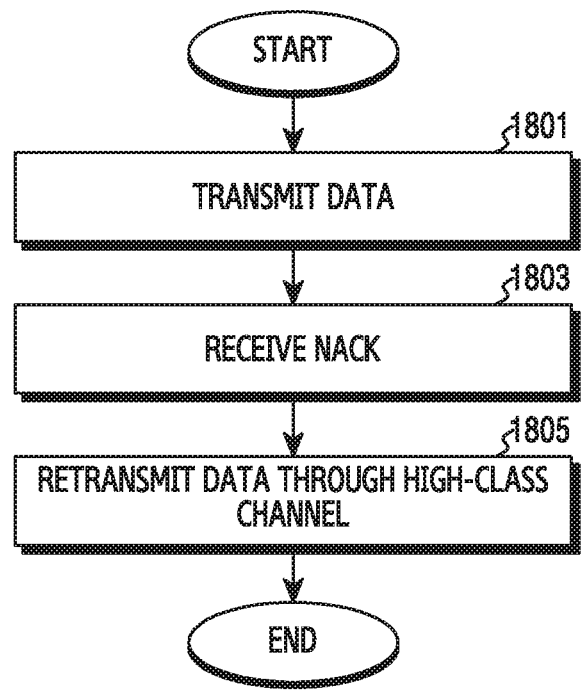
FIG. 18 illustrates a data retransmission procedure in a wireless communication system according to an embodiment of the present disclosure.

FIG. 18 illustrates a data retransmission procedure in a wireless communication system according to an embodiment of the present disclosure. FIG. 18 illustrates the operation method of the terminal 110.

Referring to FIG. 18, the terminal transmits a data signal in operation 1801. The data signal is transmitted through a channel allocated by the base station. In this instance, the data signal may include initial transmission data, or may include retransmission data.

Subsequently, the terminal proceeds with operation 1803, and receives a NACK. The NACK indicates that decoding of the data transmitted in operation 1801 fails. In this instance, although not illustrated in FIG. 18, the terminal may further receive channel allocation information. Here, the channel allocation information indicates a channel allocated for retransmission, and indicates a channel having a higher class than that of the channel used in operation 1801. In this instance, the degree of increase in a class may be changed based on the detailed content of the rule.

Subsequently, the terminal proceeds with operation 1805, and retransmits data through the high-class channel. In this instance, the retransmission data may include a different version of parity bits from that of initial transmission data (e.g., data transmitted in operation 1801), or may include the same signal.

The above-described channel class classification may be utilized for selecting a channel for channel bonding. Channel bonding is a scheme of allocating a plurality of channels at the same time so as to increase the amount of usable resources, thereby supporting larger-capacity transmission. That is, the terminal may use a larger amount of resources corresponding to the number of bonded channels, whereby a larger amount of traffic is transmitted within a shorter time. Hereinafter, an embodiment of utilizing a channel class for channel bonding will be described.

Figure 19:
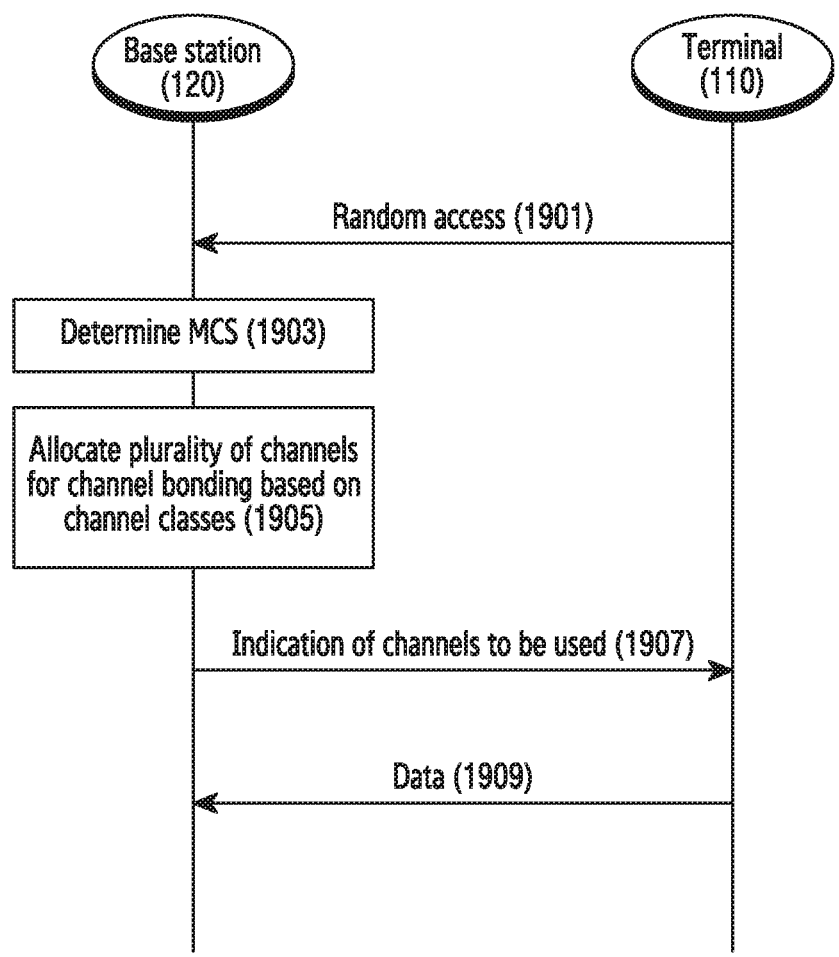
FIG. 19 illustrates a communication procedure using channel bonding in a wireless communication system according to an embodiment of the present disclosure.

FIG. 19 illustrates a communication procedure using channel bonding in a wireless communication system according to an embodiment of the present disclosure. FIG. 19 illustrates the operation method of the terminal 110 and the base station 120.

Referring to FIG. 19, in operation 1901, the terminal 110 performs random access to the base station 120. That is, the terminal 110 transmits a random-access signal. The random-access signal is one of previously defined sequences, and may be referred to as a 'random-access preamble'. Here, the random-access signal may be transmitted through a channel allocated for random access. In this instance, the base station 120 may measure the quality of a channel with the terminal using a signal received in an initial access procedure.

In operation 1903, the base station 120 may determine the MCS class to be applied to the terminal 110. In this instance, the base station 120 determines the MCS class based on channel quality. According to another embodiment of the present disclosure, operation 1903 may be performed after operation 1905. In this instance, the base station 120 may determine the MCS class based on a difference in the amount of interference between allocated channels and the channel used in operation 1901. In other words, the base station 120 may compensate channel quality based on the difference in the amount of interference, and may determine the MCS class based on the compensated channel quality.

In operation 1905, the base station 120 may allocate, to the terminal 110, a plurality of channels for channel bonding based on channel classes. In this instance, according to an embodiment of the present disclosure, the base station 120 may allocate a plurality of channels having the same class. Accordingly, a plurality of channels, which are not adjacent to each other on the frequency axis, may be allocated for channel bonding. According to another embodiment of the present disclosure, the base station 120 may allocate the plurality of channels having classes, the difference in classes being within a predetermined difference. That is, the difference in classes between the channels that are available for channel bonding may be defined in advance.

In operation 1907, the base station 120 transmits information indicating the channels to be used to the terminal 110. In this instance, the base station 120 may further transmit information indicating an MCS class. In other words, the base station 120 transmits resource allocation information including MCS allocation information and channel allocation information. Here, the resource allocation information may be transmitted through a channel allocated for control information.

In operation 1909, the terminal 110 transmits a data signal to the base station 120. Particularly, the terminal 110 may generate the data signal by performing encoding and modulation according to the MCS class indicated by the MCS allocation information. The terminal 110 transmits the data signal through the plurality of channels indicated by the channel allocation information. To perform signal transmission based on channel bonding, the terminal 110 may use a plurality of RF chains or adjust a sampling rate, thereby generating a broadband signal.

Figure 20:
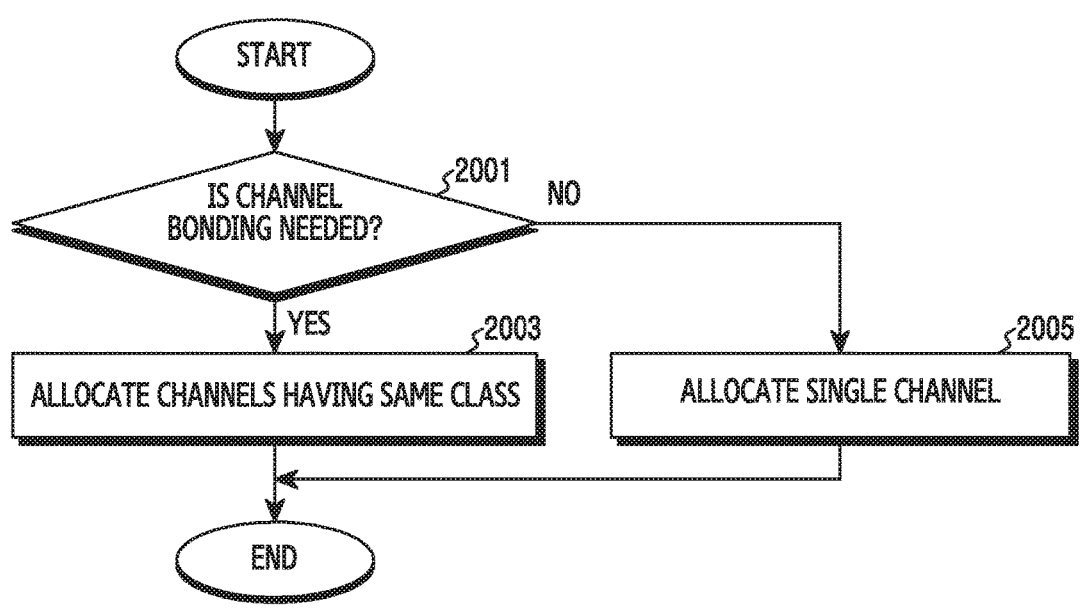
FIG. 20 illustrates a channel allocation procedure for channel bonding in a wireless communication system according to an embodiment of the present disclosure.

FIG. 20 illustrates a channel allocation procedure for channel bonding in a wireless communication system according to an embodiment of the present disclosure. FIG. 20 illustrates the operation method of the base station 120.

Referring to FIG. 20, the base station determines whether channel bonding is required in operation 2001. Whether channel bonding is required may be determined based on the state of available channels, the characteristics of a terminal, the characteristics of an application executed in the terminal, a request from the terminal, and the like.

When it is determined that channel bonding is required, the base station proceeds with operation 2003 and allocates channels having the same class. Accordingly, channels that are not adjacent to each other on the frequency axis may be allocated to one terminal. In this instance, according to another embodiment of the present disclosure, the base station may allocate channels having classes, the difference in classes being within a predetermined difference. For example, when the predetermined difference is 2, the base station may allocate a channel having a class i and a channel having a class i+2.

Conversely, when it is determined that channel bonding is not needed, the base station proceeds with operation 2005, and allocates a single channel. In this instance, the base station may allocate a channel based on the priority of the terminal, whether power control is allowed, the state of available channels, a load state, or the like.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present invention are not limited to a single element or multiple elements thereof. Further, either multiple elements expressed in the description may be configured into a single element or a single element in the description may be configured into multiple elements.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method for operating a terminal in a first wireless communication system, the method comprising:
receiving channel allocation information indicating at least one channel among channels in a guard band of a second wireless communication system; and
transmitting a data signal through the at least one channel by using a transmission power equal to or less than a maximum transmittable power of the at least one channel,
wherein the channels are classified by an amount of interference and the maximum transmittable power,
wherein the amount of the interference is determined based on a predefined leakage power from the second wireless communication system in the guard band, and
wherein the maximum transmittable power is determined based on a predefined reception filter used for the second wireless communication system.

2. The method of claim 1, further comprising:
transmitting a control signal indicating whether power control is allowed.

3. The method of claim 2, further comprising:
determining whether the power control is allowed based on a variation in a reception strength of a signal received from a base station.

4. The method of claim 1, further comprising:
receiving channel allocation information indicating a channel that corresponds to an amount of interference less than that of the at least one channel, and information indicating that data decoding fails; and
retransmitting data included in the data signal through the channel.

5. A base station in a first wireless communication system, the base station comprising:
a transceiver; and
at least one processor coupled to the transceiver,
wherein the transceiver is configured to:
transmit channel allocation information to a terminal indicating at least one channel among channels in a guard band of a second wireless communication system, and
receive, from the terminal, a data signal through the at least one channel, the data signal being transmitted from the terminal by using a transmission power equal to or less than a maximum transmittable power of the at least one channel,
wherein the channels are classified by an amount of interference and the maximum transmittable power,
wherein the amount of the interference is determined based on a predefined leakage power from the second wireless communication system in the guard band, and
wherein the maximum transmittable power is determined based on a predefined reception filter used for the second wireless communication system.

6. The base station of claim 5, wherein the transceiver is further configured to receive, from the terminal, a control signal indicating whether power control is allowed.

7. The base station of claim 5, wherein the at least one processor is configured to allocate a channel having a class greater than or equal to a criteria if the terminal is incapable of performing power control.

8. The base station of claim 5, wherein the at least one processor is configured to allocate a channel having a class corresponding to a smallest amount of interference from among allocable channels if the terminal is capable of performing power control.

9. The base station of claim 5, wherein the at least one processor is configured to determine a modulation and coding scheme (MCS) based on a channel quality of the terminal and a difference in an amount of interference between a channel that transfers a signal used for measuring the channel quality and the at least one channel.

10. The base station of claim 9, wherein the at least one processor is configured to:
measure the channel quality using a signal received by a channel used for initial access of the terminal, and
compensate the channel quality based on the difference in the amount of interference.

11. The base station of claim 9, wherein the at least one processor is configured to:
receive the channel quality measured through a synchronization signal, and
compensate the channel quality based on the difference in the amount of interference.

12. The base station of claim 5, wherein the at least one processor is configured to allocate a channel for retransmission, where an amount of interference less than that of the at least one channel occurs, if decoding data included in the data signal fails.

13. The base station of claim 5, wherein the at least one channel includes a plurality of channels where a same amount of interference occurs, which are allocated for channel bonding.

14. The base station of claim 5, wherein the amount of interference from the second wireless communication system is determined based on a central frequency and a bandwidth of an operating band of the second wireless communication system.

15. A terminal in a first wireless communication system, the terminal comprising:
a transceiver; and
at least one processor coupled to the transceiver,
wherein the transceiver is configured to:
receive channel allocation information indicating at least one channel among channels in a guard band of a second wireless communication system, and
transmit a data signal through the at least one channel based on the channel allocation information by using a transmission power equal to or less than a maximum transmittable power of the at least one channel,
wherein the channels are classified by an amount of interference and the maximum transmittable power,
wherein the amount of the interference is determined based on a predefined leakage power from the second wireless communication system in the guard band, and
wherein the maximum transmittable power is determined based on a predefined reception filter used for the second wireless communication system.

16. The terminal of claim 15, wherein the transceiver is further configured to:
transmit a control signal indicating whether power control is allowed.

17. The terminal of claim 16, wherein the at least one processor is configured to:
determine whether the power control is allowed based on a variation in a reception strength of a signal received from a base station.

18. The method of claim 15, wherein the transceiver is further configured to:
receive channel allocation information indicating a channel that corresponds to an amount of interference less than that of the at least one channel, and information indicating that data decoding fails, and
retransmit data included in the data signal through the channel.

19. The terminal of claim 15, wherein the at least one channel includes a plurality of channels where a same amount of interference occurs, which are allocated for channel bonding.

20. The terminal of claim 15, wherein the amount of interference from the second wireless communication system is determined based on a central frequency and a bandwidth of an operating band of the second wireless communication system.

* * * * *